(12) United States Patent
Ueno et al.

(10) Patent No.: US 10,812,950 B2
(45) Date of Patent: *Oct. 20, 2020

(54) ELECTRONIC APPARATUS, CONTROL DEVICE, COMPUTER-READABLE NON-TRANSITORY RECORDING MEDIUM AND OPERATION METHOD OF ELECTRONIC APPARATUS

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,550

(22) Filed: May 13, 2019

(65) Prior Publication Data

US 2019/0268737 A1 Aug. 29, 2019

Related U.S. Application Data

(63) Continuation of application No. PCT/JP2017/040571, filed on Nov. 10, 2017.

(30) Foreign Application Priority Data

Nov. 22, 2016 (JP) ................................ 2016-226611

(51) Int. Cl.
*H04W 4/33* (2018.01)
*H04W 4/38* (2018.01)
(Continued)

(52) U.S. Cl.
CPC ............ *H04W 4/33* (2018.02); *G01C 21/206* (2013.01); *G01C 21/26* (2013.01); *G01S 19/48* (2013.01);
(Continued)

(58) Field of Classification Search
CPC ......... H04W 4/33; H04W 4/38; H04W 4/021; H04W 4/40; H04W 52/0254; H04W 4/00;
(Continued)

(56) References Cited

U.S. PATENT DOCUMENTS 6,233,448 B1    5/2001  Alperovich et al.
2009/0199291 A1  8/2009  Hayasaka et al.
(Continued)

FOREIGN PATENT DOCUMENTS

DE        10041714 A1      5/2002
DE    102014006956 A1    11/2014
(Continued)

OTHER PUBLICATIONS

Qualcomm Incorporated, "Updates to Vulnerable Road User (VRU) use cases", 3GPP TSG-SA WG1 Meeting #72, S1-154434, Nov. 16-20, 2015, pp. 1-7, Anaheim, CA, USA.

*Primary Examiner* — Inder P Mehra
(74) *Attorney, Agent, or Firm* — Studebaker & Brackett PC

(57) ABSTRACT

An electronic apparatus comprises an indoor determiner and a notification determiner. The indoor determiner performs an indoor determination for determining whether or not a user of the electronic apparatus is located in an indoor. The notification determiner performs determination processing for determining whether or not the electronic apparatus transmits a notification outside the electronic apparatus based on a result of the indoor determination.

14 Claims, 15 Drawing Sheets

(51) Int. Cl.
*H04W 4/021* (2018.01)
*H04W 4/40* (2018.01)
*H04W 52/02* (2009.01)
*H04W 4/00* (2018.01)
*G08B 21/24* (2006.01)
*G08G 1/005* (2006.01)
*G01C 21/20* (2006.01)
*G01S 19/48* (2010.01)
*H04M 1/00* (2006.01)
*G01C 21/26* (2006.01)

(52) U.S. Cl.
CPC ............ *G08B 21/24* (2013.01); *G08G 1/005* (2013.01); *H04M 1/00* (2013.01); *H04W 4/38* (2018.02)

(58) Field of Classification Search
CPC ....... H04W 52/02; H04W 76/04; H04W 4/04; G01C 21/26; G01C 21/206; G01C 21/20; H04M 1/00; G08G 1/005; G08B 21/24; G01S 19/48; G01S 19/14; H04L 67/12
USPC ...................................................... 455/456.1
See application file for complete search history.

(56) References Cited

U.S. PATENT DOCUMENTS

| | | |
|---|---|---|
| 2010/0317366 A1 | 12/2010 | Shen et al. |
| 2012/0157128 A1 | 6/2012 | Aust et al. |
| 2012/0252495 A1 | 10/2012 | Moeglein et al. |
| 2013/0137450 A1 | 5/2013 | Dai et al. |
| 2013/0342024 A1* | 12/2013 | Byun .................. H04B 5/0037 307/104 |
| 2014/0179298 A1 | 6/2014 | Grokop et al. |
| 2014/0200846 A1 | 7/2014 | Wachter et al. |
| 2014/0274114 A1 | 9/2014 | Rowitch |
| 2014/0341061 A1 | 11/2014 | Shinada et al. |
| 2015/0035685 A1 | 2/2015 | Strickland et al. |
| 2015/0153437 A1 | 6/2015 | Baumgartner et al. |
| 2015/0220817 A1 | 8/2015 | Kujirai |
| 2015/0247917 A1 | 9/2015 | Gum et al. |
| 2016/0080911 A1 | 3/2016 | Kay et al. |
| 2016/0165396 A1 | 6/2016 | Wirola et al. |
| 2016/0198431 A1* | 7/2016 | Pattabiraman ....... H04B 7/0452 455/414.2 |
| 2016/0306338 A1 | 10/2016 | Morita |
| 2017/0048660 A1* | 2/2017 | Srinivasan ........ H04M 1/72572 |
| 2017/0055125 A1* | 2/2017 | Chiou .................. H04W 4/023 |
| 2017/0082445 A1 | 3/2017 | Tanabe et al. |
| 2017/0094541 A1 | 3/2017 | Ngai |
| 2017/0142739 A1 | 5/2017 | Fang et al. |
| 2017/0150490 A1 | 5/2017 | Chen et al. |
| 2017/0347244 A1* | 11/2017 | Zhang .................. H04W 4/027 |
| 2018/0005134 A1* | 1/2018 | Kish ..................... G06N 3/084 |

FOREIGN PATENT DOCUMENTS

| | | |
|---|---|---|
| EP | 2327995 A2 | 6/2011 |
| EP | 2680039 A1 | 1/2014 |
| JP | 2003-258942 A | 9/2003 |
| JP | 2009-188771 A | 8/2009 |
| JP | 2010-250680 A | 11/2010 |
| JP | 2011-002243 A | 1/2011 |
| JP | 2011-049931 A | 3/2011 |
| JP | 2014-508285 A | 4/2014 |
| JP | 2014-123847 A | 7/2014 |
| JP | 2015-099101 A | 5/2015 |
| JP | 2015-148847 A | 8/2015 |
| JP | 2015-224969 A | 12/2015 |
| JP | 2016-005228 A | 1/2016 |
| JP | 2016-506668 A | 3/2016 |
| JP | 2016-512600 A | 4/2016 |
| JP | 2016-519756 A | 7/2016 |
| JP | 2016-138864 A | 8/2016 |
| JP | 2016-158118 A | 9/2016 |
| JP | 2016-163186 A | 9/2016 |
| JP | 2016-178492 A | 10/2016 |
| WO | 2013/128613 A1 | 9/2013 |
| WO | 2015/054489 A1 | 4/2015 |
| WO | WO 2015054489 * 4/2015 ............ H04W 52/02 |  |
| WO | 2015/064662 A1 | 5/2015 |

* cited by examiner

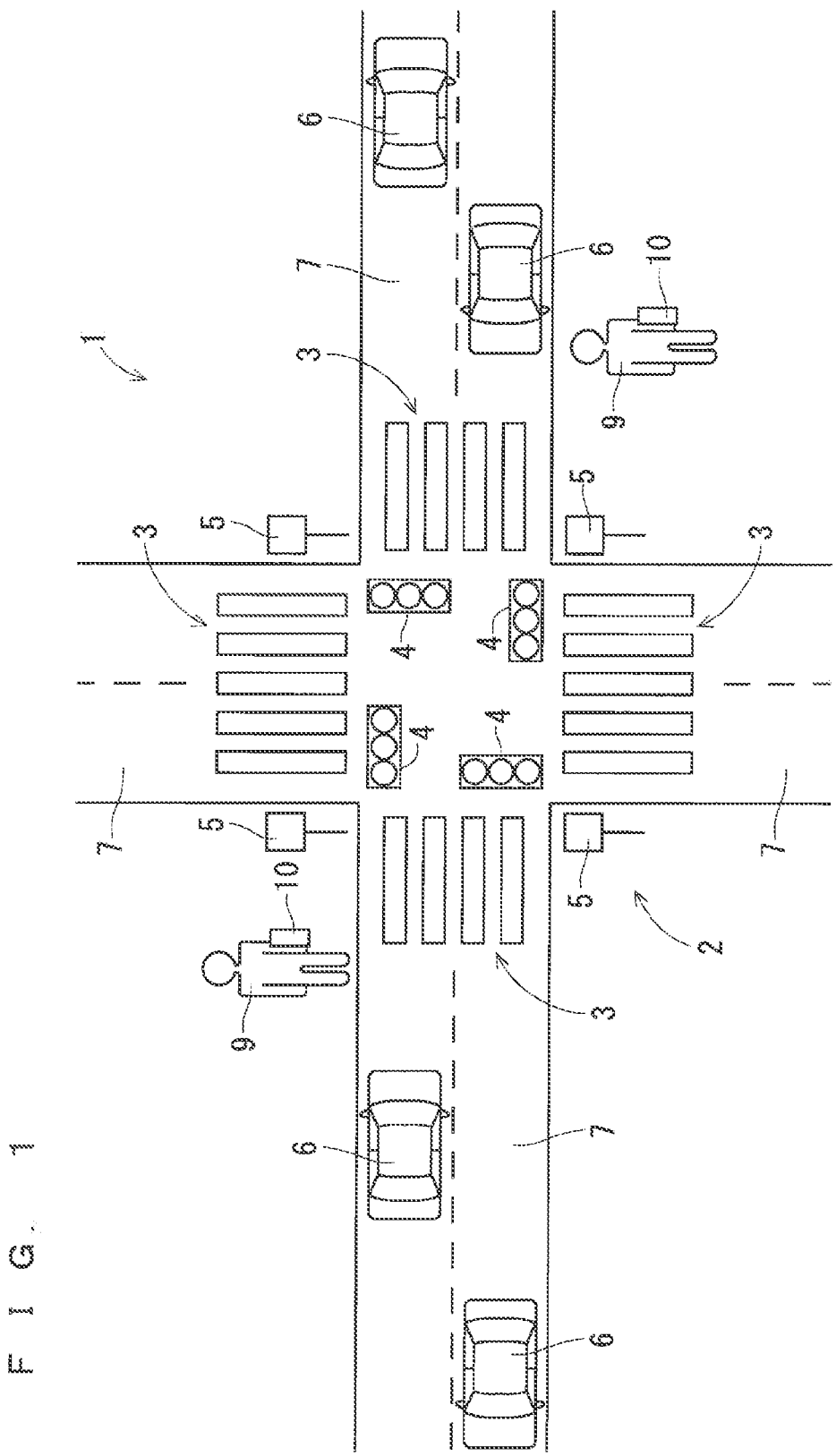

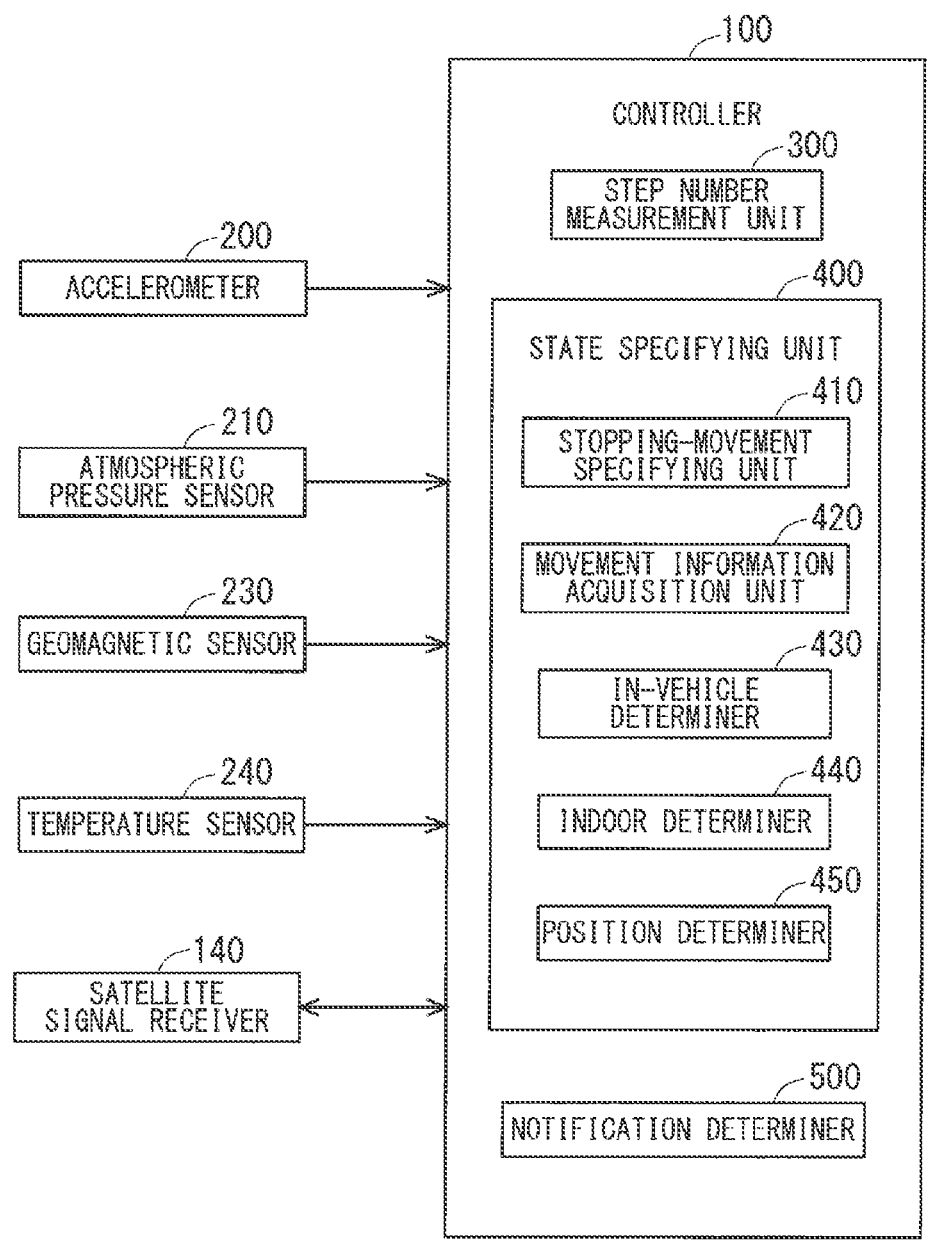
F I G . 5

F I G. 1 1
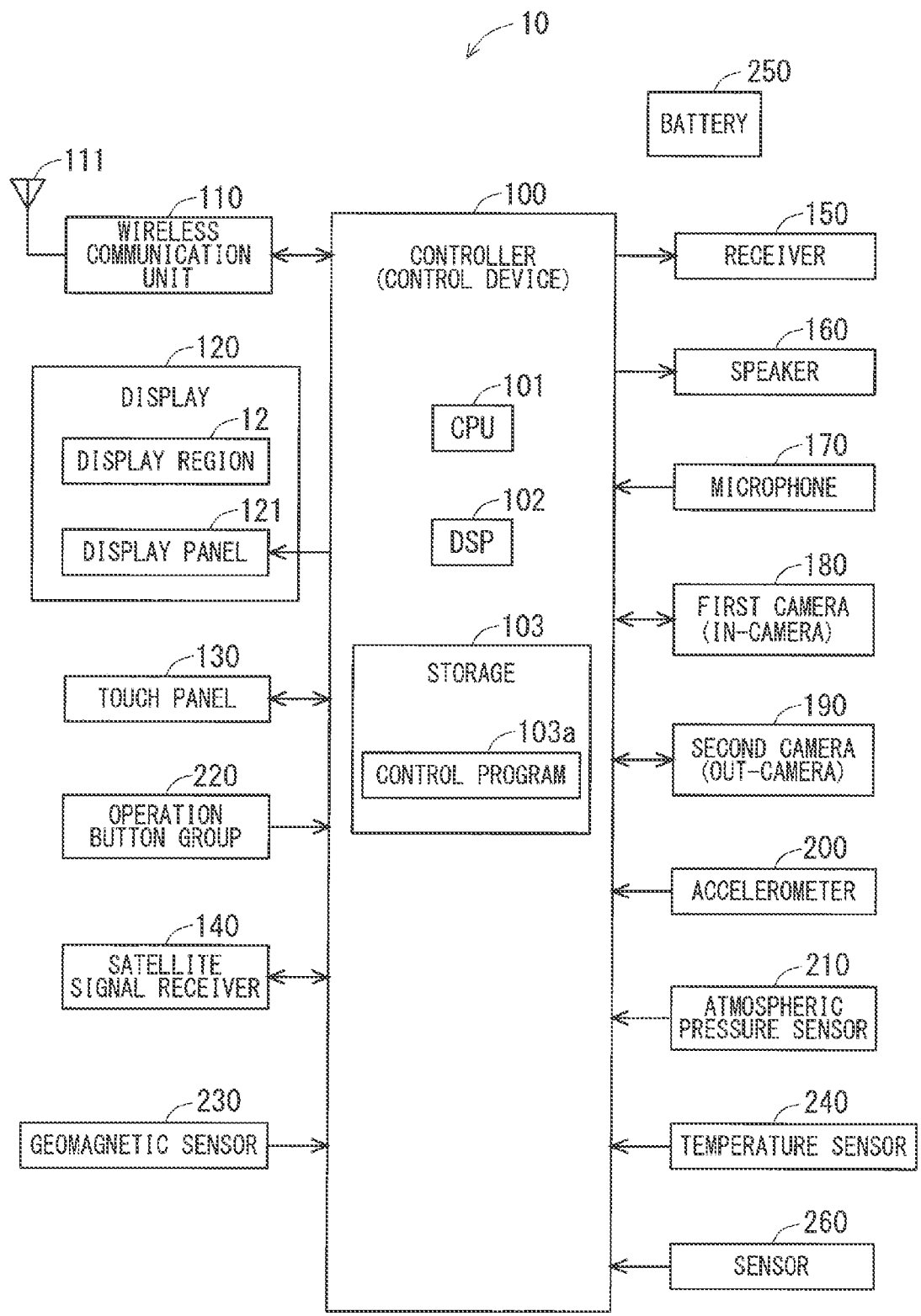

F I G . 1 2
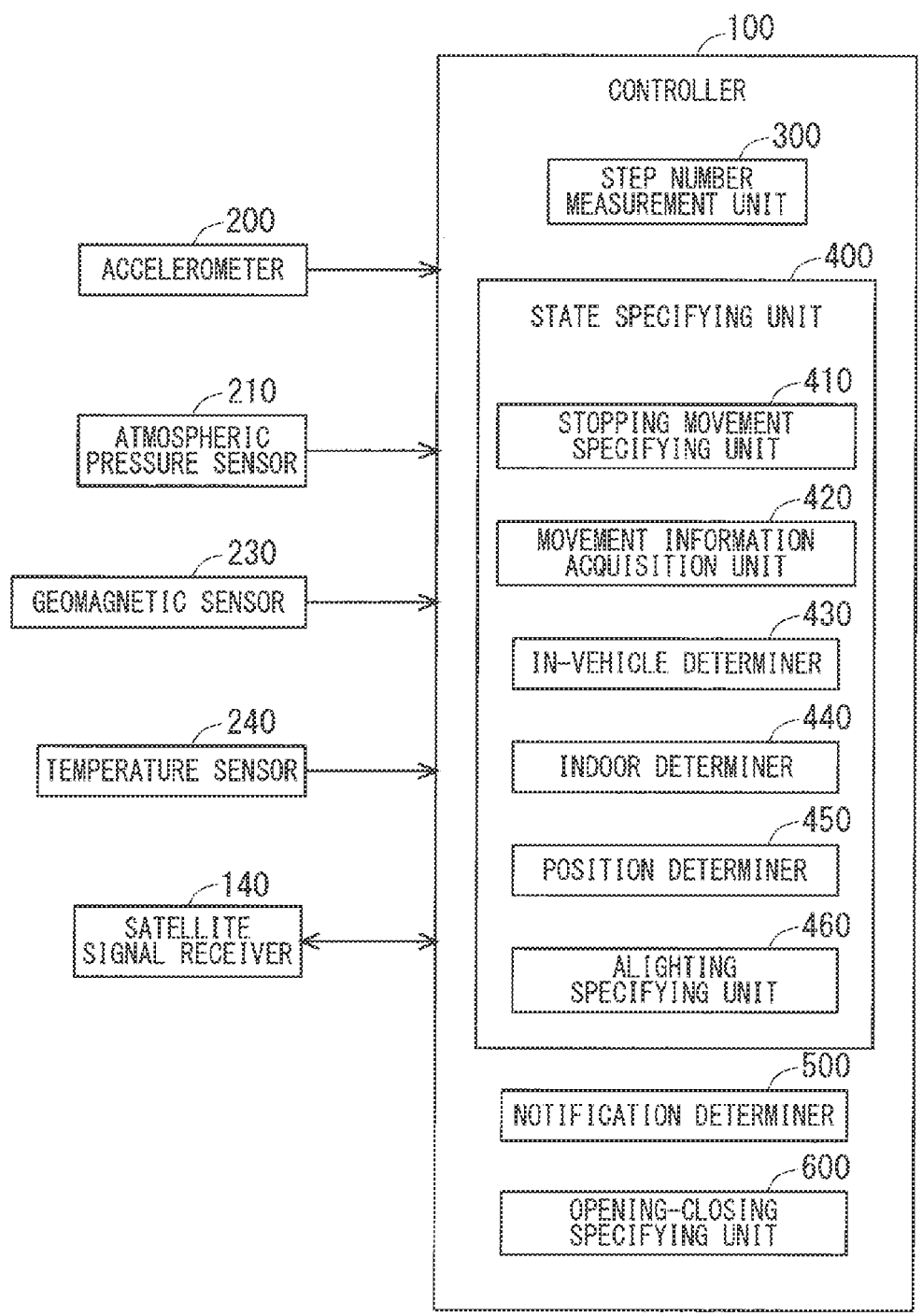

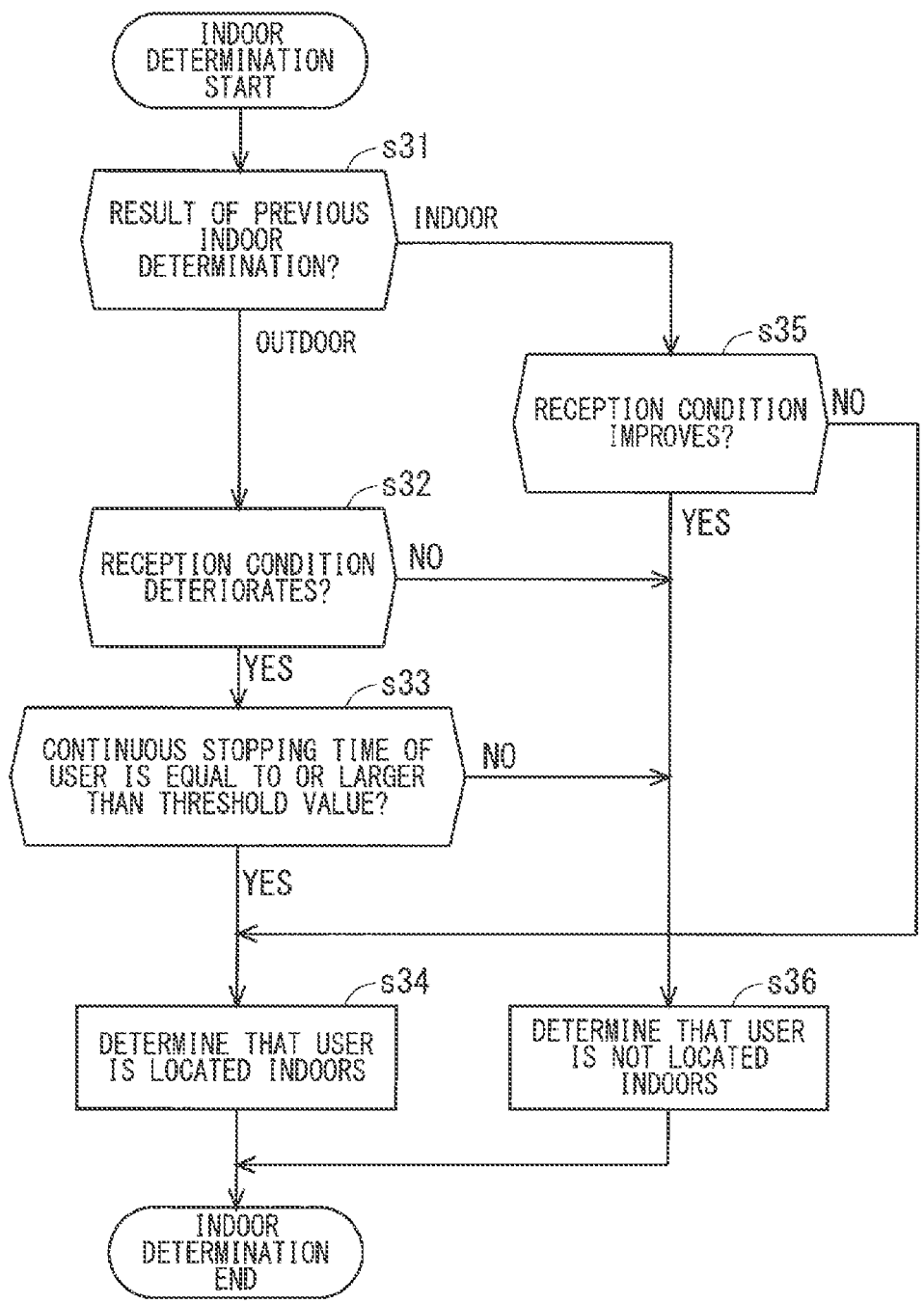
F I G . 1 3

| TIME PERIOD | HOME RATIO ||
| --- | --- | --- |
| | WEEKDAY | WEEKEND |
| 12 A.M. TO 3 A.M. | 90% | 90% |
| 3 A.M. TO 6 A.M. | 80% | 90% |
| 6 A.M. TO 9 A.M. | 30% | 70% |
| 9 A.M. TO 12 P.M. | 10% | 40% |
| 12 P.M. TO 3 P.M. | 10% | 30% |
| 3 P.M. TO 6 P.M. | 10% | 30% |
| 6 P.M. TO 9 P.M. | 40% | 40% |
| 9 P.M. TO 12 A.M. | 70% | 70% |

ELECTRONIC APPARATUS, CONTROL DEVICE, COMPUTER-READABLE NON-TRANSITORY RECORDING MEDIUM AND OPERATION METHOD OF ELECTRONIC APPARATUS

CROSS-REFERENCE TO RELATED APPLICATION

The present application is a continuation based on PCT Application No. PCT/JP2017/040571 filed on Nov. 10, 2017, which claims the benefit of Japanese Application No. 2016-226611, filed on Nov. 22, 2016. PCT Application No. PCT/JP2017/040571 is entitled "ELECTRONIC DEVICE, CONTROL DEVICE, CONTROL PROGRAM AND OPERATION METHOD OF ELECTRONIC DEVICE", and Japanese Application No. 2016-226611 is entitled "ELECTRONIC APPARATUS, CONTROLLER. CONTROL PROGRAM, AND METHOD FOR OPERATING ELECTRONIC APPARATUS". The contents of which are incorporated by reference herein in their entirety.

FIELD

The present disclosure relates to electronic apparatuses.

BACKGROUND

Various techniques relating to electronic apparatuses are proposed.

SUMMARY

An electronic apparatus, control device, computer-readable non-transitory recording medium, and operation method of electronic apparatus are disclosed. In one embodiment, an electronic apparatus comprises at least one processor. The at least one processor performs an indoor determination for determining whether or not a user of the electronic apparatus is located in an indoor area. The at least one processor performs determination processing for determining whether or not the electronic apparatus transmits a notification outside the electronic apparatus based on a result of the indoor determination.

In one embodiment, a control device is a control device included in an electronic apparatus for controlling an operation of the electronic apparatus. The control device comprises at least one processor. The at least one processor performs an indoor determination for determining whether or not a user of the electronic apparatus is located in an indoor area. The at least one processor performs determination processing for determining whether or not the electronic apparatus transmits a notification outside the electronic apparatus based on a result of the indoor determination.

In one embodiment, a computer-readable non-transitory recording medium storing comprises a control program for controlling an electronic device. A control program makes the electronic apparatus execute: performing an indoor determination for determining whether or not a user of the electronic apparatus is located in an indoor area; and performing determination processing for determining whether or not the electronic apparatus transmits a notification outside the electronic apparatus based on a result of the indoor determination.

In one embodiment, an operation method of an electronic apparatus comprises: performing an indoor determination for determining whether or not a user of the electronic apparatus is located in an indoor area and performing determination processing for determining whether or not the electronic apparatus transmits a notification outside the electronic apparatus based on a result of the indoor determination.

BRIEF DESCRIPTION OF THE DRAWINGS

FIG. 1 illustrates a diagram showing one example of a system in which an electronic apparatus is used.

FIG. 5 illustrates a block diagram showing one example of a configuration of a controller.

FIG. 11 illustrates a block diagram showing one example of a configuration of the electronic apparatus.

FIG. 12 illustrates a block diagram showing one example of a configuration of the controller.

FIG. 13 illustrates a flow chart showing one example of an operation of the electronic apparatus.

DETAILED DESCRIPTION

Figure 2:
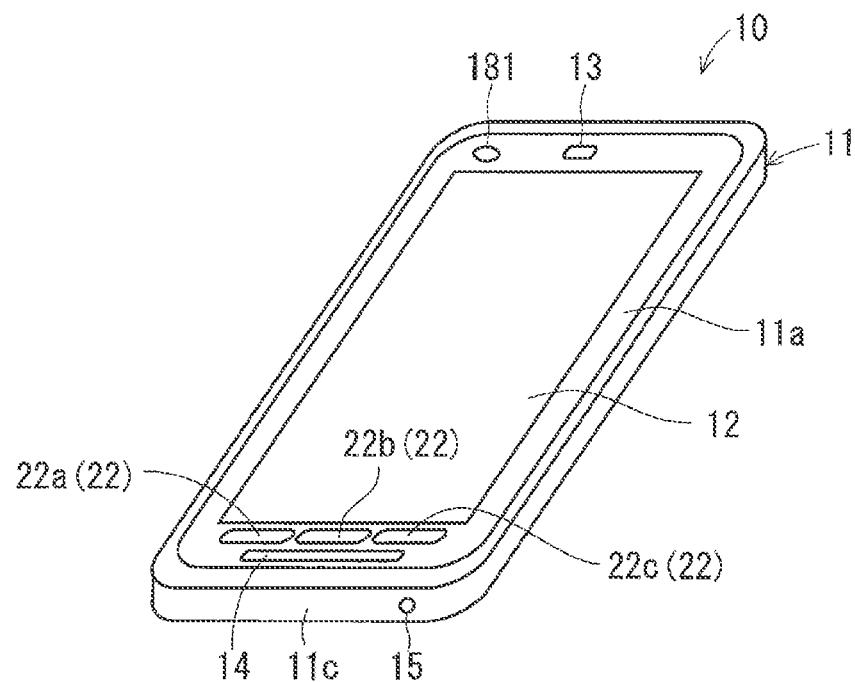
FIG. 2 illustrates a perspective view showing one example of an external appearance of the electronic apparatus.

FIG. 1 is a diagram showing one example of a system in which an electronic apparatus 10 is used. The electronic apparatus 10 is, for example, a mobile phone such as a smartphone. The electronic apparatus 10 can be used in intelligent transport systems (ITS), for example. Specifically, the electronic apparatus 10 can be used in a safe driving support communication system 1 of the ITS. The safe driving support communication system 1 is also referred to as a safe driving support system or a safe driving support wireless system.

As illustrated in FIG. 1, in the safe driving support communication system 1, a roadside unit 5 disposed in an intersection 2, for example, a vehicle 6 such as an automobile traveling along a roadway 7, and the electronic apparatus 10 held by a user 9 who is a pedestrian can perform a wireless communication with each other. Thus, the roadside unit 5, the vehicle 6, and the electronic apparatus 10 can exchange information. A plurality of vehicles 6 can perform a wireless communication with each other. Thus, the plurality of vehicles 6 can exchange information. A communication between the roadside unit 5 and the vehicle 6, a communication between the vehicles 6, a communication between the roadside unit 5 and the electronic apparatus 10 of the pedestrian, and a communication between the electronic apparatus 10 of the pedestrian and the vehicle 6 are referred to as a road-to-vehicle communication, an inter-vehicle communication, a road-to-pedestrian communication, and a pedestrian-to-vehicle communication, respectively.

The roadside unit 5 can notify the vehicle 6 and the electronic apparatus 10 of information regarding a lighting of a traffic light 4 and information regarding a highway regulation, for example. The roadside unit 5 can detect the vehicle 6 and a pedestrian near the roadside unit 5. The roadside unit 5 disposed in the intersection 2 can detect a pedestrian crossing at a crosswalk 3, for example. Then, the roadside unit 5 can notify the vehicle 6 and the electronic apparatus 10 of information regarding the detected vehicle 6 and pedestrian. The roadside unit 5 can notify the other vehicle 6 and the other electronic apparatus 10 of information notified by the vehicle 6 and the electronic apparatus 10.

The vehicle 6 can notify the other vehicle 6, the roadside unit 5, and the electronic apparatus 10 of information regarding an indicator of the vehicle 6, a position of the vehicle 6, and a speed of the vehicle 6, for example. Then, the vehicle 6 can support safe driving of a driver by transmitting various notifications such as a caution, based on the notified information, to the driver. The user 6 can transmit the various notifications to the driver using a speaker and a display device, for example. The vehicle 6 can transmit the various notifications to the driver using a car navigation device mounted on the vehicle 6, for example.

The electronic apparatus 10 can specify a state of the user 9 of the electronic apparatus 10. The electronic apparatus 10 can notify the roadside unit 5, for example, of information regarding the specified state of the user 9. An operation of the electronic apparatus 10 is described in detailed hereinafter.

As described above, the safe driving support communication system 1 performs the road-to-vehicle communication, the inter-vehicle communication, the road-to-pedestrian communication, and the pedestrian-to-vehicle communication, thereby supporting the safe driving of the driver of the vehicle 6.

The example in FIG. 1 illustrates a vehicle of an automobile as the vehicle 6, however, the vehicle 6 may be a vehicle other than the automobile. For example, the vehicle 6 may be a vehicle of a bus or a vehicle of a light rail system. The electronic apparatus 10 can also be used in a system other than the safe driving support communication system 1.

<One Example of External Appearance of Electronic Apparatus>

Figure 3:
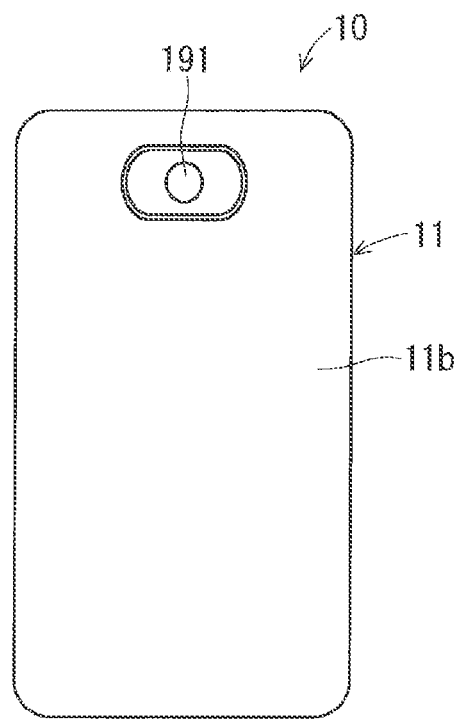
FIG. 3 illustrates a rear view showing one example of the external appearance of the electronic apparatus.

FIGS. 2 and 3 are a perspective view and a rear view showing one example of an external appearance of the electronic apparatus 10, respectively. As illustrated in FIGS. 2 and 3, the electronic apparatus 10 comprises an apparatus case 10 having a plate shape substantially rectangular in a plan view. The apparatus case 11 constitutes an exterior of the electronic apparatus 10.

A display region 12, in which various types of information such as characters, symbols, and graphics are displayed, is located in a front surface 11a of the apparatus case 11. A touch panel 130, which will be described below, is located in a rear surface side of the display region 12. Accordingly, the user 9 can input various types of information to the electronic apparatus 10 by operating the display region 12 in the front surface of the electronic apparatus 10 with his/her finger, for example. The user 9 can also input the various types of information to the electronic apparatus 10 by operating the display region 12 with a pen for the touch panel such as a stylus pen, for example, instead of an operator such as his/her finger.

A receiver hole 13 is located in an upper end of the front surface 11a of the apparatus case 11. A speaker hole 14 is located in a lower end of the front surface 11a A microphone hole 15 is located in a side surface 11c in a lower side of the apparatus case 11.

A lens 181 included in a first camera 180, which will be described below, can be visually recognized from the upper end of the front surface 11a of the apparatus case 11. As illustrated in FIG. 3, a lens 191 included in a second camera 190, which will be described below, can be visually recognized from an upper end of a rear surface 11b of the apparatus case 11.

The electronic apparatus 10 comprises an operation button group 220 including a plurality of operation buttons 22 (refer to FIG. 4 described below). Each of the plurality of the operation buttons 22 is a hardware button, for example. Specifically, each of the plurality of the operation buttons 22 is a press button. At least one operation button 22 included in the operation button group 220 may also be a software button displayed in the display region 12.

The operation button group 220 includes operation buttons 22a, 22b, and 22c located in the lower end of the front surface 11a of the apparatus case 11. The operation button group 220 includes a power button and a volume button located in a surface of the apparatus case 11.

The operation button 22a is a back button, for example. The back button is an operation button for switching a display in the display region 12 to an immediately preceding display. The user 9 operates the operation button 22a to switch the display in the display region 12 to the immediately preceding display. The operation button 22b is a home button, for example. The home button is an operation button for displaying a home screen in the display region 12. The user 9 operates the operation button 22b to display the home screen in the display region 12. The operation button 22c is a history button, for example. The history button is an operation button to display a history of an application executed by the electronic apparatus 10 in the display region 12. When the user 9 operates the operation button 22c, the history of the application executed by the electronic apparatus 10 is displayed in the display region 12.

<One Example of Electrical Configuration of Electronic Apparatus>

Figure 4:
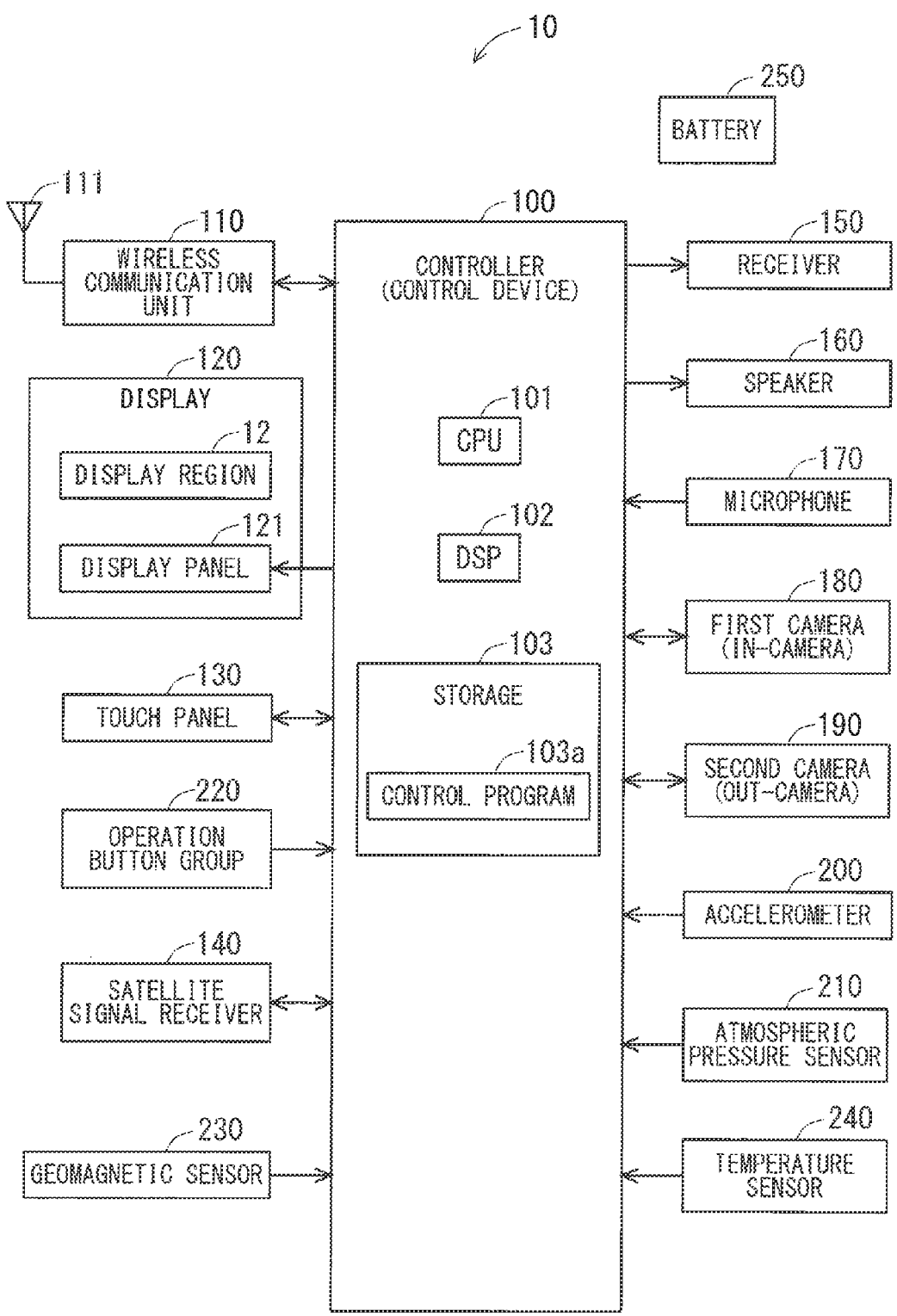
FIG. 4 illustrates a block diagram showing one example of a configuration of the electronic apparatus.

FIG. 4 is a block diagram mainly showing one example of an electrical configuration of the electronic apparatus 10. As illustrated in FIG. 4, the electronic apparatus 10 comprises a controller 100, a wireless communication unit 110, a display 120, the touch panel 130, the operation button group 220, a satellite signal receiver 140, and a geomagnetic sensor 230. The electronic apparatus 10 further comprises a receiver 150, a speaker 160, a microphone 170, the first camera 180, the second camera 190, an accelerometer 200, an atmospheric pressure sensor 210, a temperature sensor 240, and a battery 250. The apparatus case 11 houses these components included in the electronic apparatus 10.

The controller 100 controls the other components of an electronic apparatus 10 to be able to collectively manage the operation of the electronic apparatus 10. The controller 100 is also considered as a control device. The controller 100 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

In the present example, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a to control the electronic apparatus 10. The CPU 101 and the DSP 102 execute the various control programs 103a in the storage 103 to achieve various functions of the controller 100.

A configuration of the controller 100 is not limited to the example in FIG. 4. For example, the controller 100 may comprise a plurality of CPUs 101. In this case, the controller 100 may comprise a main CPU performing comparative complex processing and a sub CPU performing comparative simple processing. It is also applicable that the controller 100 does not comprise the DSP 102 or comprises a plurality of DSPs 102. All or some of the functions of the controller 100 may be achieved by a hardware circuit that needs no software to achieve the functions above.

The storage 103 may comprise a non-transitory computer readable recording medium other than the ROM and the RAM. The storage 103 may comprise, for example, a compact hard disk drive and a solid state drive (SSD).

The plurality of control programs 103a in the storage 103 include various applications (application programs). The storage 103 stores, for example, a call application to perform a voice call and a video call, a browser to display a website, and a mail application to create, browse, send, and receive an e-mail. The storage 103 also stores a camera application to take a picture of an object using the first camera 180 and the second camera 190, a recorded image display application to display a still image and a video recorded in the storage 103, and a music reproduction control application to control a reproduction of music data stored in the storage 103. The storage 103 may store at least one application in the storage 103 in advance. The electronic apparatus 10 may download the at least one application in the storage 103 from the other device and store it in the storage 103.

The wireless communication unit 110 comprises an antenna 111. The wireless communication unit 110 can perform a wireless communication in several types of communication systems, for example, using the antenna 111. The controller 100 controls the wireless communication of the wireless communication unit 110.

The wireless communication unit 110 can perform a wireless communication with a base station of a mobile phone system. The wireless communication unit 110 can communicate with a mobile phone different from the electronic apparatus 10 or a web server via a network such as the base station or Internet. The electronic apparatus 10 can perform a data communication, a voice call, and a video call with the other mobile phone, for example.

The wireless communication unit 110 can perform a wireless communication with the roadside unit 5 and the vehicle 6. The wireless communication unit 110 can perform a wireless communication using the wireless local area network (LAN) such as Wifi. The wireless communication unit 110 can perform a near field wireless communication. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to obtain information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111.

The display 120 comprises the display region 12 located in the front surface of the electronic apparatus 10 and a display panel 121. The display 120 can display various types of information in the display region 12. The display panel 121 is a liquid crystal display panel or an organic EL panel, for example. The display panel 121 can display various types of information such as characters, symbols, and graphics under control of the controller 100. The display panel 121 faces the display region 12 in the apparatus case 11. The information displayed on the display panel 121 is displayed in the display region 12.

The touch panel 130 can detect an operation performed on the display region 12 with the operator such as the finger. The touch panel 130 is, for example, a projected capacitive touch panel. The touch panel 130 is located on a back side of the display region 12, for example. When the user 9 performs the operation on the display region 12 with the operator such as his/her finger, the touch panel 130 can input, to the controller 100, an electrical signal corresponding to the operation. The controller 100 can specify contents of the operation performed on the display region 12 based on an output signal being output from the touch panel 130. The controller 100 can perform the processing corresponding to the specified operation contents.

When the user 9 operates each operation button 22 of the operation button group 220, the operation button 22 can output to the controller 100 an operation signal indicating that the operation button 22 has been operated. The controller 100 can accordingly determine whether or not each operation button 22 has been operated for each operation button 22. The controller 100 to which the operation signal is input controls the other component, thereby causing the electronic apparatus 10 to execute the function allocated to the operated operation button 22.

The satellite signal receiver 140 can receive a satellite signal transmitted by a positioning satellite. Then, the satellite signal receiver 140 can obtain positional information of the electronic apparatus 10 based on the received satellite signal. Specifically, the satellite signal receiver 140 captures the positioning satellite, that is to say, obtains information necessary to calculate the positional information of the electronic apparatus 10 from the satellite signal transmitted by the positioning satellite. Then, the satellite signal receiver 140 can obtain the positional information of the electronic apparatus 10 based on the obtained information. The satellite signal receiver 140 outputs to the controller 100 the number of the captured positioning satellites, that is to say, the number of the positioning satellites each transmitting the satellite signal, from which the information necessary to calculate the positional information can be obtained. The positional information obtained by the electronic apparatus 10 includes a latitude and a longitude indicating a position of the electronic apparatus 10, for example. The controller 100 can operate the satellite signal receiver 140 and stop the operation thereof. The number of the positioning satellites captured by the satellite signal receiver 140 may be referred to as "the number of the captured satellites" in some cases. The satellite signal receiver 140 may be simply referred to as "the receiver 140" in some cases.

The receiver 140 is a GPS (global positioning system) receiver, for example, and can receive a wireless signal from the positioning satellite of a GPS. The receiver 140 calculates a current position of the electronic apparatus 10 with a latitude and a longitude, for example, based on the received wireless signal, and outputs the positional information including the calculated latitude and longitude to the controller 100. The positional information of the electronic apparatus 10 is also considered as positional information of the user 9 holding the electronic apparatus 10.

The receiver 140 may obtain the positional information of the electronic apparatus 10 based on the signal transmitted by the positioning satellite of global navigation satellite system (GNSS) other than GPS. For example, the receiver 140 may obtain the positional information of the electronic apparatus 10 based on a signal transmitted by a positioning satellite of global navigation satellite system (GLONASS), Indian regional navigational satellite system (IRNSS), COMPASS, Galileo, or quasi-zenith satellites system (QZSS).

The microphone 170 can convert a sound being input from the outside of the electronic apparatus 10 into an electrical sound signal and then output the electrical sound signal to the controller 100. The sound from the outside of the electronic apparatus 10 is taken inside the electronic apparatus 10 through the microphone hole 15 and input to the microphone 170.

The speaker 160 is, for example, a dynamic speaker. The speaker 160 can convert an electrical sound signal from the controller 100 into a sound and then output the sound. The sound being output from the speaker 160 is output outside through the speaker hole 14. The user 9 can hear the sound being output from the speaker hole 14 in a place apart from the electronic apparatus 10.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 13. A volume of the sound being output through the receiver hole 13 is set to be smaller than a volume of the sound being output through the speaker hole 14. The user 9 brings the receiver hole 13 close to his/her ear, thereby being able to hear the sound being output through the receiver hole 13. The electronic apparatus 10 may comprise a vibration element such as a piezoelectric vibration element for causing a portion of the front surface of the apparatus case 11 to vibrate instead of the receiver 150. In this case, the sound is transmitted to the user in a form of the vibration of the portion of the front surface.

The first camera 180 comprises the lens 181, an image sensor, and so on. The second camera 190 comprises the lens 191, an image sensor, and so on. Each of the first camera 180 and the second camera 190 can take an image of an object under control of the controller 100, generate a still image or a video of the object, and then output the still image or the video to the controller 100.

The lens 181 of the first camera 180 can be visually recognized from the front surface 11a of the apparatus case 11. Accordingly, the first camera 180 can take an image of an object located on a front surface side (in other words, a display region 12 side) of the electronic apparatus 10. The first camera 180 is referred to as an in-camera. In the meanwhile, the lens 191 of the second camera 190 can be visually recognized from the rear surface 11b of the apparatus case 11. Accordingly, the second camera 190 can take an image of an object located on a rear surface side of the electronic apparatus 10. The second camera 190 is referred to as an out-camera.

The accelerometer 200 can detect an acceleration of the electronic apparatus 10. The accelerometer 200 is a three-axis accelerometer, for example. The accelerometer 200 can detect an acceleration of the electronic apparatus 10 in an x axis direction, a y axis direction, and a z axis direction. The x axis direction, the y axis direction, and the z axis direction are set to a longitudinal direction, a short-side direction, and a thickness direction of the electronic apparatus 10, respectively, for example.

The atmospheric pressure sensor 210 can detect an atmospheric pressure around the electronic apparatus 10. The geomagnetic sensor 230 can detect a magnetic field (also referred to as a magnetizing field) around the electronic apparatus 10. The geomagnetic sensor 230 is a three-axis geomagnetic sensor, for example. The geomagnetic sensor 230 can detect the magnetic field in an x axis direction, an y axis direction, and an z axis direction. The x axis direction, the y axis direction, and the z axis direction are set to the longitudinal direction, the short-side direction, and the thickness direction of the electronic apparatus 10, respectively, for example. The temperature 240 can detect a temperature around the electronic apparatus 10.

The battery 250 can output a power source for the electronic apparatus 10. The battery 250 is, for example, a rechargeable battery. The battery 250 can supply the power source to various components such as the controller 100 and the wireless communication unit 110 included in the electronic apparatus 10.

It is also applicable that the electronic apparatus 10 does not comprise at least one of the sensors of the accelerometer 200, the atmospheric pressure sensor 210, the geomagnetic sensor 230, and the temperature sensor 240. In this case, the electronic apparatus 10 may have a wireless or wired connection with the at least one of the sensors separated from the electronic apparatus 10.

The electronic apparatus 10 may comprise a sensor other than the accelerometer 200, the atmospheric pressure sensor 210, the geomagnetic sensor 230, and the temperature sensor 240. For example, the electronic apparatus 10 may comprise at least one of a proximity sensor, an illuminance sensor, and a gyro sensor. The electronic apparatus 10 may have a wireless or wired connection with the sensor other than the accelerometer 200, the atmospheric pressure sensor 210, the geomagnetic sensor 230, and the temperature sensor 240 separated from the electronic apparatus 10.

It is also applicable that the electronic apparatus 10 does not comprise the receiver 140. In this case, the electronic apparatus 10 may have a wireless or wired connection with the receiver 140 separated from the electronic apparatus 10.

<One Example of Function Block in Controller>

FIG. 5 is a drawing showing one example of some of function blocks formed when the CPU 101 and the DSP 102 execute a control program 103a in the storage 103.

As illustrated in FIG. 5, the controller 100 comprises a step number measurement unit 30X), a state specifying unit 400, and a notification determiner 500, for example, as the function blocks. At least one of the step number measurement unit 300, the state specifying unit 400, and the notification determiner 500 may be achieved by a hardware circuit that needs no software to achieve the functions above.

The state specifying unit 400 can specify various states of the user 9. The state specifying unit 400 comprises, for example, a stopping-movement specifying unit 410, a movement information acquisition unit 420, an in-vehicle determiner 430, an indoor determiner 440, and a position determiner 450. At least one of the stopping-movement specifying unit 410, the movement information acquisition unit 420, the in-vehicle determiner 430, the indoor determiner 440, and the position determiner 450 may be achieved by a hardware circuit that needs no software to achieve the functions above.

When the controller 100 comprises a main CPU and a sub CPU, the sub CPU may achieve some function blocks and the main CPU may achieve the remaining function blocks in the plurality of the function blocks illustrated in FIG. 5. For example, the sub CPU may achieve the stopping-movement specifying unit 410 and the main CPU may achieve the remaining function blocks.

The stopping-movement specifying unit 410 can perform a stopping-movement specification for specifying the state of the user 9 regarding the stopping and the movement of the user 9. The stopping-movement specifying unit 410 can specify the user 9 stopping and the user 9 traveling in the stopping-movement specification. In other words, the stopping-movement specifying unit 410 can determine whether the user 9 is in a stopping state or a traveling state. Still in other words, the stopping-movement specifying unit 410 can determine whether or not the user 9 travels. The stopping-movement specifying unit 410 can specify the user 9 stopping and the user 9 traveling based on at least one of the positional information obtained by the receiver 140 and the acceleration detected by the accelerometer 200, for example.

The stopping-movement specifying unit 410 can specify the user 9 stopping and the user 9 starting traveling in the stopping-movement specification. The stopping-movement specifying unit 410 determines that the user 9 stops when the state of the user 9 changes from the traveling state to the stopping state. The stopping-movement specifying unit 410 determines that the user 9 starts traveling when the state of the user 9 changes from the stopping state to the traveling state.

The stopping of the user 9 is considered as the stopping of the movement of the electronic apparatus 10, thus the stopping-movement specifying unit 410 is deemed to be able to specify the stopping of the movement of the electronic apparatus 10. The start of the movement of the user 9 is considered as the start of the movement of the electronic apparatus 10, thus the stopping-movement specifying unit 410 is deemed to be able to specify the start of the movement of the electronic apparatus 10.

A timing of when the state of the user 9 changes from the stopping state to the traveling state is considered as a movement-start timing of the user 9 and a movement-start timing of the electronic apparatus 10. The stopping-movement specifying unit 410 can specify, in the stopping-movement specification, the movement-start timing of the user 9, in other words, the movement-start timing of the electronic apparatus 10. A timing of when the state of the user 9 changes from the traveling state to the stopping state is considered as a stop timing of the user 9 and a movement-stop timing of the electronic apparatus 10. The stopping-movement specifying unit 410 can specify, in the stopping-movement specification, the stop timing of the user 9, in other words, the movement-stop timing of the electronic apparatus 10.

The stopping-movement specifying unit 410 can specify, in the stopping-movement specification, a travel means of the user 9 when the stopping-movement specifying unit 410 determines that the user 9 is traveling. For example, the stopping-movement specifying unit 410 can specify whether the user 9 is traveling by himself/herself without riding a conveying device or traveling in the conveying device, based on the acceleration detected by the accelerometer 200. Herein, the term "the user 9 travels by himself/herself" means that the user 9 travels with his/her foot without riding the conveying device. When the action of the user 9 traveling by himself/herself is referred to as "self traveling", the stopping-movement specifying unit 410 is deemed to be able to specify the self traveling of the user 9. When the action of the user 9 traveling in the conveying device is referred to as "conveying-device traveling", the stopping-movement specifying unit 410 can specify the conveying-device traveling of the user 9.

The self traveling which the stopping-movement specifying unit 410 can specify includes the movement of the user 9 by walking and the movement of the user 9 by running. When the action of the user 9 traveling by running is referred to as "running", the self traveling includes the walking and the running. The conveying-device traveling which the stopping-movement specifying unit 410 can specify includes the movement of the user 9 by bicycle and the movement of the user 9 by a conveying device, such as an automobile, a train, and a bus, which enables a traveling faster than the bicycle.

Hereinafter, the simple term "the conveying device" means a conveying device which enables the traveling faster than the bicycle, in order to distinguish the bicycle from a conveying device which enables the traveling faster than the bicycle. The term "self" is used as a name of a travel means in the case where the user 9 performs the self traveling, the term "walking" is used as a name of a travel means in the case where the user 9 travels by walking, and the term "running" is used as a name of a travel means in the case where the user 9 travels by running.

Known is that the acceleration of the electronic apparatus 10 shows a specific pattern of time change corresponding to the travel means of the user 9 having the electronic apparatus 10. The stopping-movement specifying unit 410 specifies that the travel means of the user 9 is "walking" when the pattern of the time change of the acceleration detected by the accelerometer 200 shows the pattern corresponding to "walking". The stopping-movement specifying unit 410 specifies that the travel means of the user 9 is "running" when the pattern of the time change of the acceleration detected by the accelerometer 200 shows the pattern corresponding to "running". The stopping-movement specifying unit 410 specifies that the travel means of the user 9 is "bicycle" when the pattern of the time change of the acceleration detected by the accelerometer 200 shows the pattern corresponding to "bicycle". The stopping-movement specifying unit 410 specifies that the travel means of the user 9 is "conveying device" when the pattern of the time change of the acceleration detected by the accelerometer 200 shows the pattern corresponding to "conveying device".

In the manner described above, the stopping-movement specifying unit 410 can specify which is the travel means of the user 9, the walking, the running, the bicycle, or the conveying device. The controller 100 can display the travel means specified by the stopping-movement specifying unit 410 and a moving distance of the user 9 (a moving distance of the electronic apparatus 10), for example, on the display 120. Accordingly, the user 9 can confirm a walking distance, a running distance, a moving distance by bicycle, and a moving distance by the conveying device distinctively from each other. The controller 100 can obtain the moving distance of the user 9 based on the positional information obtained by the receiver 140, for example.

The movement information acquisition unit 420 can obtain movement information indicating a movement of the user 9. The movement information includes at least one of a continuous stopping time of the user 9, a continuous walking time of the user 9, a continuous walking step number of the user 9, and a traveling direction of the user 9, for example. Details of the movement information are described hereinafter.

The in-vehicle determiner 430 can perform an in-vehicle determination for determining whether or not the user 9 is in the vehicle 6. An inside of the vehicle 6 is referred to as "inside vehicle" in some cases hereinafter. A state where the user 9 is in the vehicle 6 is simply referred to as "inside vehicle" and a state where the user 9 is not in the vehicle 6 is simply referred to as "outside vehicle" in some cases. Details of the in-vehicle determination are described hereinafter.

The indoor determiner 440 can determine whether or not the user 9 is in a facility such as a house, a building, and a shop. That is to say, the indoor determiner 440 can perform an indoor determination for determining whether or not the user 9 is located in an indoor. A state where the user 9 is located in an indoor is simply referred to as "indoor" and a state where the user 9 is not located in an indoor is simply referred to as "outdoor" in some cases. Details of the indoor determination are described hereinafter.

The position determiner 450 can determine whether or not the user 9 is located in a predetermined region (in other words, a predetermined position). In other words, the position determiner 450 can determine whether or not the electronic apparatus 10 is located in a predetermined region (in other words, a predetermined position). Adopted as the predetermined region are, for example, an area where an accident is likely to occur between the pedestrian and the vehicle 6 and a region including a neighborhood of the area. The predetermined region includes, for example, an intersection region including the intersection 2 and a neighborhood thereof, a T-shaped intersection region including a T-shaped intersection and a neighborhood thereof, and a school route region including a school route of children and a neighborhood thereof. The position determiner 450 can separately determine whether or not the user 9 is located in the intersection region, whether or not the user 9 is located in the T-shaped intersection region, and whether or not the user 9 is located in the school route region.

The position determiner 450 can determine whether or not the user 9 is located in the predetermined region based on the positional information obtained by the receiver 140 and map information stored in the storage 103, for example. The position determiner 450 may determine whether or not the user 9 is located in the predetermined region based on whether or not the wireless communication unit 110 can receive the signal from the roadside unit 5 disposed in the intersection 2, for example.

As described above, the state specifying unit 400 can specify various states of the user 9. The types of the states of the user 9 specified by the state specifying unit 400 are not limited to those described above.

The step number measurement unit 300 can measure the number of steps of the user 9 who performs the self traveling. The step number measurement unit 300 measures the number of steps of the user 9 who performs the self traveling based on the acceleration detected by the accelerometer 200), for example. The step number measurement unit 300 measures the number of steps of the user 9 when the stopping-movement specifying unit 410 specifies that the user 9 is walking or running. The controller 100 can display the number of steps measured by the step number measurement unit 300 on the display 120. The number of steps measured by the step number measurement unit 300 is simply referred to as "the measured number of steps" in some cases hereinafter.

The notification determiner 500 can perform determination processing for determining whether or not the electronic apparatus 10 transmits a notification outside the electronic apparatus 10 based on the state of the user 9 specified by the state specifying unit 400, for example.

For example, when the position determiner 450 determines that the user 9 is located in the intersection region and also when the stopping-movement specifying unit 410 specifies that the travel means of the user 9 is "running", the notification determiner 500 determines that the electronic apparatus 10 transmits the notification outside the electronic apparatus 10. When the position determiner 450 determines that the user 9 is located in the intersection region and also when the stopping-movement specifying unit 410 specifies that the travel means of the user 9 is "bicycle", the notification determiner 500 determines that the electronic apparatus 10 transmits the notification outside the electronic apparatus 10. When the notification determiner 500 determines that the electronic apparatus 10 transmits the notification outside the electronic apparatus 10, the wireless communication unit 110 transmits presence notification information for notifying the vehicle 6 located in the intersection region of the presence of the user 9 (in other words, the pedestrian) near the vehicle 6 to the roadside unit 5. The presence notification information may include information indicating the travel means of the user 9 specified by the stopping-movement specifying unit 410. The roadside unit 5 transmits the received presence notification information to the vehicle 6 located in the intersection region. At this time, the roadside unit 5 transmits the presence notification information in a broadcast form, for example. The vehicle 6 notifies a driver, for example, of a caution based on the received presence notification information. The vehicle 6 notifies the driver that the pedestrian is located near the vehicle 6 using a car navigation device, for example. Accordingly, the driver of the vehicle 6 located in the intersection region can drive the vehicle 6 while recognizing a person in the intersection region. As a result, safety in driving the vehicle 6 is increased. The state where the electronic apparatus 10 transmits the notification outside the electronic apparatus 10 is referred to as "notification execution" in some cases hereinafter. The state where the electronic apparatus 10 does not transmit the notification outside the electronic apparatus 10 is referred to as "notification non-execution" in some cases.

Contents of the information which the electronic apparatus 10 transmits outside the electronic apparatus 10 are not limited to the examples descried above. The electronic apparatus 10 can also directly transmit the notification to the vehicle 6.

<Example of Operation Flow of Electronic Apparatus>

Figure 6:
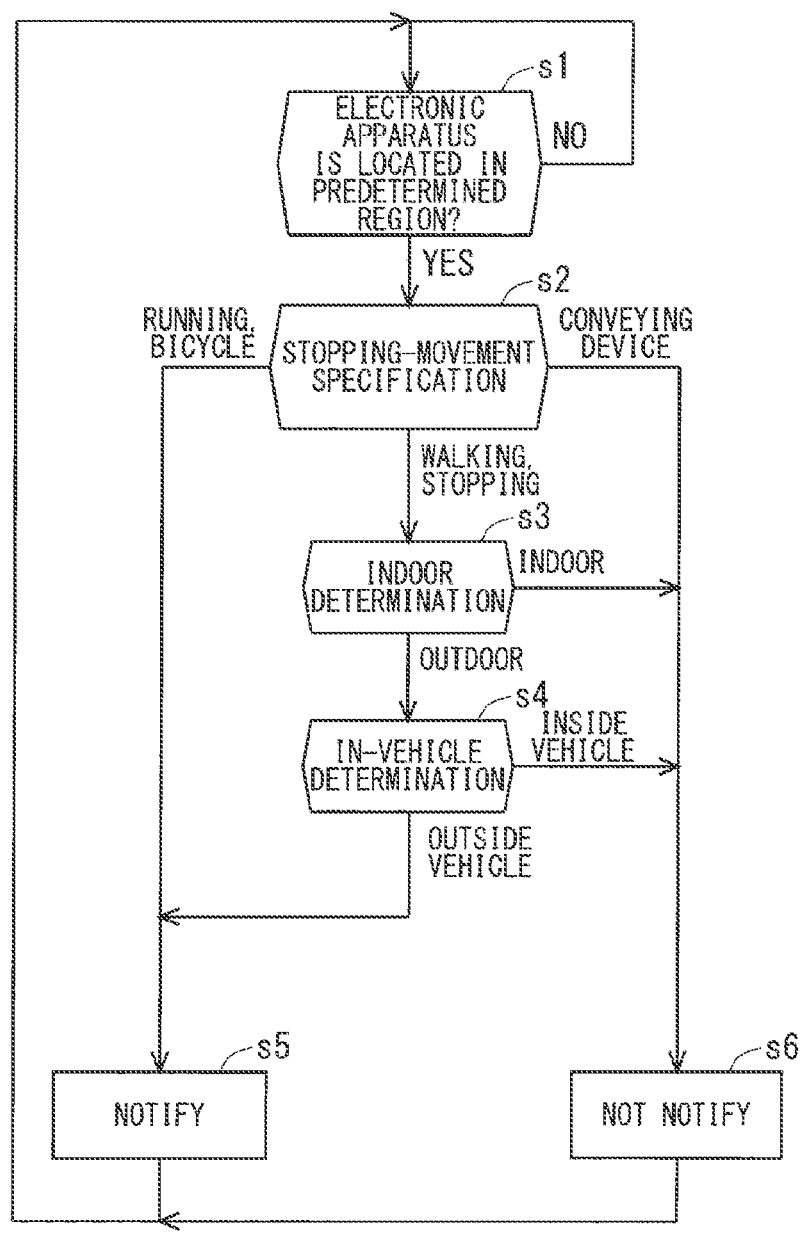
FIG. 6 illustrates a flow chart showing one example of an operation of the electronic apparatus.

FIG. 6 is a flow chart showing one example of an operation of the electronic apparatus 10 before the electronic apparatus 10 transmits the notification outside. A series of processing of Steps s1 to s6 illustrated in FIG. 6 is executed repeatedly at regular or irregular intervals.

As illustrated in FIG. 6, in Step s1, the position determiner 450 determines whether or not the electronic apparatus 10 is located in the predetermined region. When it is determined in Step s1 that the electronic apparatus 10 is located in the predetermined region, the stopping-movement specifying unit 410 specifies the stopping and the movement in Step s2. When it is not determined in Step s1 that the electronic apparatus 10 is located in the predetermined region, Step s1 is executed again.

When the user 9 is traveling and it is specified that the travel means of the user 9 is "conveying device" in the stopping-movement specification in Step s2, the notification determiner 500 determines the notification non-execution in Step s6. When the travel means of the user 9 is the conveying device such as the automobile, the train, and the bus, the user 9 has a high possibility of being safe from the vehicle 6. Accordingly, it is deemed that there is a less need for providing the driver of the vehicle 6 with the caution. Thus, when it is specified that the travel means of the user 9 is "conveying device", the notification determiner 500 determines that the electronic apparatus 10 does not transmit the notification outside. Accordingly, when the user 9 is safe from the vehicle 6, a possibility that the driver of the vehicle 6 receives information which is not so much necessary can be reduced. Thus, a possibility that the driver of the vehicle 6 feels bothersome due to the receipt of the information which is not so much necessary can be reduced. When Step s6 is executed, the electronic apparatus 10 executes Step s1 again, and subsequently operates in the similar manner.

When the user 9 is traveling and it is specified that the travel means of the user 9 is "running" in the stopping-movement specification in Step s2, Step 5 is executed. When the user 9 is traveling and it is specified that the travel means of the user 9 is "bicycle" in the stopping-movement specification, Step 5 is executed. In Step s5, the notification determiner 500 determines the notification execution. When the travel means of the user 9 is "running" and "bicycle", the user 9 is far from being safe from the vehicle 6. Thus, when it is specified that the travel means of the user 9 is "running" or "bicycle", the notification determiner 500 determines that the electronic apparatus 10 transmits the notification outside. When Step s5 is executed, the electronic apparatus 10 executes Step s1 again, and subsequently operates in the similar manner.

When the notification determiner 500 determines the notification execution, the wireless communication unit 110 notifies the roadside unit 5 of the presence notification information described above, for example. The roadside unit 5 notifies the vehicle 6 located in the predetermined region of the received presence notification information. When it is determined that the electronic apparatus 10 is located in the T-shaped intersection region, for example, in Step s1, the roadside unit 5 provided in the T-shaped intersection region notifies the vehicle 6 located in the T-shaped intersection region of the presence notification information received from the electronic apparatus 10. The vehicle 6 notifies a driver of a caution based on the received presence notification information. The electronic apparatus 10 may directly notify the vehicle 6 located in the T-shaped intersection region of the presence notification information.

When it is specified that the user 9 is stopping in the stopping-movement specification of Step s2, the indoor determiner 440 performs the indoor determination in Step s3. When it is specified that the user 9 is traveling and the travel means of the user 9 is "walking" in the stopping-movement specification, the indoor determiner 440 performs the indoor determination in Step s3.

When the location of the user 9 is determined to be "indoor" in the indoor determination of Step s3, Step s6 is executed and the notification non-execution is determined. When the user 9 is located in the facility such as the building, the user 9 has a high possibility of being safe from the vehicle 6. Accordingly, when the user 9 is determined to be located indoors, it is determined that the electronic apparatus 10 does not transmit the notification outside.

In the meanwhile, when the location of the user 9 is determined to be "outdoor" in the indoor determination of Step s3, the in-vehicle determiner 430 performs the in-vehicle determination in Step s4. When the location of the user 9 is determined to be "inside vehicle" in the in-vehicle determination, Step s6 is executed and the notification non-execution is determined. When the user 9 is located in the vehicle 6, the user 9 has a high possibility of being safe from the other vehicle 6. Accordingly, when the user 9 is determined to be in the vehicle, it is determined that the electronic apparatus 10 does not transmit the notification outside.

When the location of the user 9 is determined to be "outside vehicle" in the in-vehicle determination of Step s4, that is to say, when the user 9 is not located indoors and is not in the vehicle, Step s5 is executed and the notification execution is determined. When the user 9 is located outdoors and is located outside the vehicle, the user 9 is far from being safe from the vehicle 6. Accordingly, when it is determined that the user is not located indoors and is not in the vehicle, it is determined that the electronic apparatus 10 transmits the notification outside.

The notification determiner 500 may determine the notification execution instead of Step s6. In this case, for example, the electronic apparatus 10 may transmit, via the roadside unit 5 or directly to the vehicle 6, notification information for notifying that the user 9 located near the vehicle 6 has a small risk of running out into a roadway.

Figure 7:
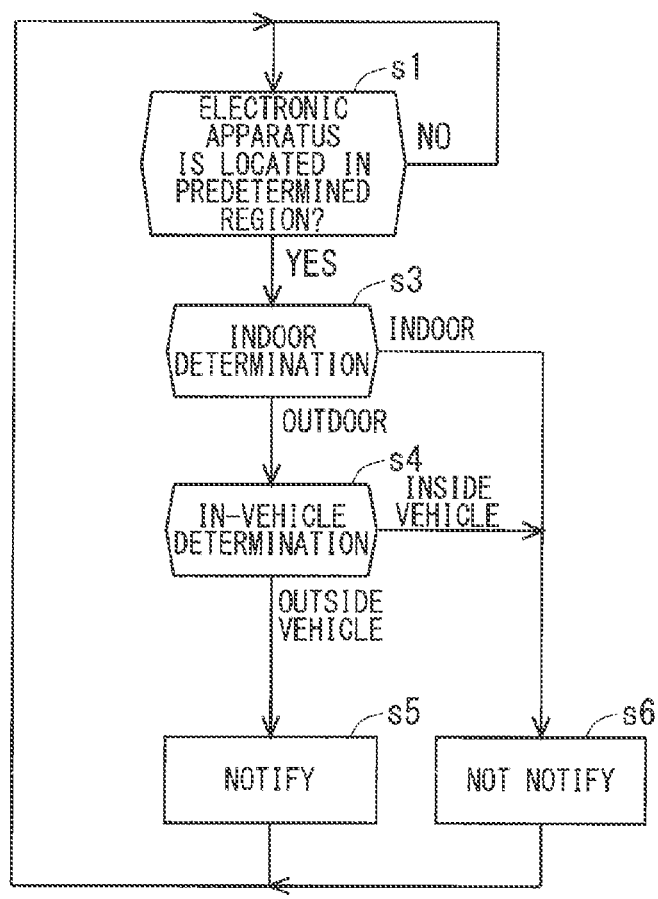
FIG. 7 illustrates a flow chart showing one example of an operation of the electronic apparatus.

As illustrated in FIG. 7, the stopping-movement specification of Step s2 may not be executed. In this case, when it is determined that the electronic apparatus 10 is located in the predetermined region in Step s1, the indoor determination of Step s3 is executed.

Figure 8:
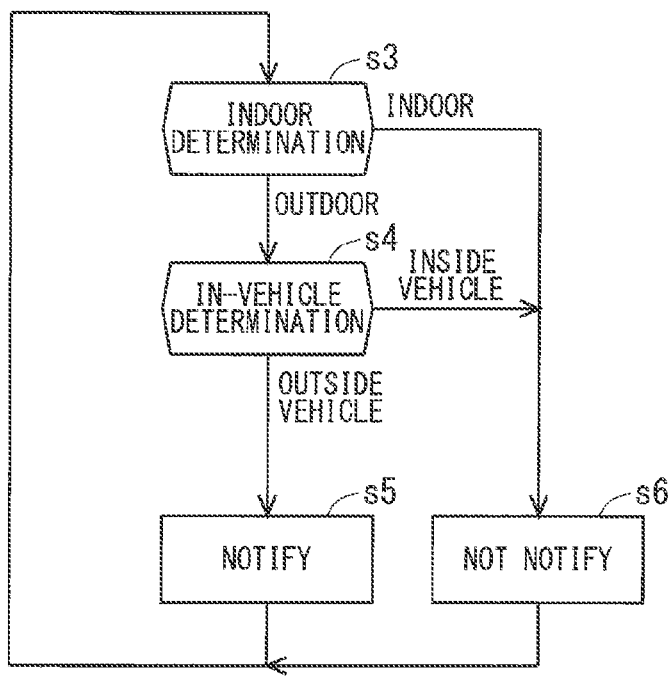
FIG. 8 illustrates a flow chart showing one example of an operation of the electronic apparatus.

As illustrated in FIG. 8, Step s1 may not be executed. In the example in FIG. 8, Step s1 is not executed in the flow in FIG. 7, however, Step s1 may not be executed in the flow in FIG. 6. In this case, when Step s5 is executed, Step s2 is executed again, and when Step s6 is executed, Step s2 is executed again.

Figure 9:
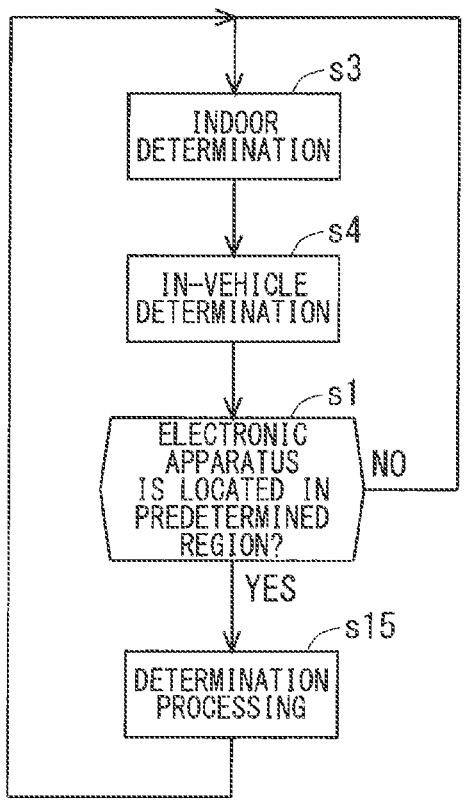
FIG. 9 illustrates a flow chart showing one example of an operation of the electronic apparatus.

As illustrated in FIG. 9, Step s1 may be executed after the indoor determination and the in-vehicle determination. In the example in FIG. 9, the indoor determination is executed in Step s3, and the in-vehicle determination is subsequently executed in Step s4. Then, Step s1 is executed. When it is determined that the electronic apparatus 10 is located in the predetermined region in Step s1, the notification determiner 500 performs the determination processing for determining whether or not the electronic apparatus 10 transmits the notification outside based on the result of the indoor determination of Step s3 and the in-vehicle determination of Step s4. When the location of the user 9 is determined to be "indoor" in the indoor determination of Step s15, the notification determiner 500 determines the notification non-execution. When the location of the user 9 is determined to be "inside vehicle" in the in-vehicle determination, the notification determiner 500 determines the notification non-execution. Then, when the location of the user 9 is determined to be "outdoor" in the in-vehicle determination and determined to be "outside vehicle" in the in-vehicle determination, the notification determiner 500 determines the notification execution.

Although the stopping-movement specification is not performed in the example in FIG. 9, the stopping-movement specification may be performed before Step s1. In this case, in Step s15, the notification determiner 500 determines whether or not the electronic apparatus 10 transmits the notification outside based on the result of the stopping-movement specification, the result of the indoor determination, and the result of the in-vehicle determination. For example, when the travel means is determined to be "conveying device" in the stopping-movement specification, the notification determiner 500 determines the notification non-execution. When the location of the user 9 is determined to be "indoor" in the indoor determination, the notification determiner 500 determines the notification non-execution. When the location of the user 9 is determined to be "inside vehicle" in the indoor determination, the notification determiner 500 determines the notification non-execution. For example, when the travel means is determined to be "running" in the stopping-movement specification, the notification determiner 500 determines the notification execution. When the travel means is determined to be "bicycle" in the stopping-movement specification, the notification determiner 500 determines the notification execution. Then, when the location of the user 9 is determined to be "outdoor" in the indoor determination and determined to be "outside vehicle" in the in-vehicle determination, the notification determiner 500 determines the notification execution.

An order of executing the indoor determination and the in-vehicle determination may be switched in each example described above. The indoor determination and the in-vehicle determination may be parallelly performed. One of the indoor determination and the in-vehicle determination may not be performed.

As described above, the notification determiner 500 performs the determination processing for determining whether or not the electronic apparatus 10 transmits the notification outside based on the result of the in-vehicle determination, thus a possibility that the electronic apparatus 10 transmits the notification, which is not so much necessary, outside can be reduced. Thus, convenience of the electronic apparatus 10 is increased.

The notification determiner 500 performs the determination processing for determining whether or not the electronic apparatus 10 transmits the notification outside based on the result of the indoor determination, thus a possibility that the electronic apparatus 10 transmits the notification, which is not so much necessary, outside can be reduced. Thus, convenience of the electronic apparatus 10 is increased.

In the examples in FIGS. 6, 7, and 9, for example, the notification determiner 500 performs the determination processing when the electronic apparatus 10 is located in the predetermined region, and does not perform the determination processing when the electronic apparatus 10 is not located in the predetermined region, thus the electronic apparatus 10 can determine whether or not the electronic apparatus 10 transmits the notification outside when necessary.

In the examples in FIGS. 6 and 7, for example, the in-vehicle determiner 430 performs the in-vehicle determination when the electronic apparatus 10 is located in the predetermined region, and does not perform the in-vehicle determination when the electronic apparatus 10 is not located in the predetermined region, thus the electronic apparatus 10 can perform the in-vehicle determination when necessary.

In the examples in FIGS. 6 and 7, for example, the indoor determiner 440 performs the indoor determination when the electronic apparatus 10 is located in the predetermined region, and does not perform the indoor determination when the electronic apparatus 10 is not located in the predetermined region, thus the electronic apparatus 10 can perform the indoor determination when necessary.

In the example in FIG. 6, for example, the in-vehicle determiner 430 does not perform the in-vehicle determination when it is specified that the travel means is "conveying device", "running", and "bicycle" in the stopping-movement specification, and performs the in-vehicle determination when it is specified that the travel means is "walking". As described above, the in-vehicle determiner 430 performs the in-vehicle determination in accordance with the type of the travel means specified in the stopping-movement specification, thus the processing of the electronic apparatus 10 is simplified compared with the case where the in-vehicle determination is constantly performed.

In the example in FIG. 6, for example, the indoor determiner 440 does not perform the indoor determination when it is specified that the travel means is "conveying device", "running", and "bicycle" in the stopping-movement specification, and performs the indoor determination when it is specified that the travel means is "walking". As described above, the in-vehicle determiner 440 performs the indoor determination in accordance with the type of the travel means specified in the stopping-movement specification, thus the processing of the electronic apparatus 10 is simplified compared with the case where the indoor determination is constantly performed.

<One Example of In-Vehicle Determination>

Details of the in-vehicle determination are described next. Examples of a plural types of the in-vehicle determinations are described hereinafter.

<First Example of In-Vehicle Determination: In-Vehicle Determination Based on Presence or Absence of Communication Connection Setting>

In the present example, the in-vehicle determiner 430 determines whether or not the user 9 is in the vehicle 6 based on whether or not a setting, which is necessary to achieve a communication connection between a communication device mounted on the vehicle 6 and the wireless communication unit 110 (referred to as "the communication connection setting" in some cases hereinafter), is performed on the electronic apparatus 10. When the communication connection setting is performed on the electronic apparatus 10, the in-vehicle determiner 430 determines that the user 9 is in the vehicle. In the meanwhile, when the communication connection setting is not performed on the electronic apparatus 10, the in-vehicle determiner 430 determines that the user 9 is not in the vehicle. The communication device mounted on the vehicle 6 is referred to as "the in-vehicle communication device" in some cases hereinafter.

Examples of the in-vehicle communication device include, for example, an electronic apparatus complying with at least one of Bluetooth and Wifi. Such an in-vehicle communication device includes a car audio device and a car navigation device complying with at least one of Bluetooth and Wifi.

When a pairing is completed between the in-vehicle communication device complying with Bluetooth and the electronic apparatus 10, the communication connection setting necessary to achieve the communication connection between the in-vehicle communication device and the wireless communication unit 110 is performed on the electronic apparatus 10. When the completion of the pairing between the in-vehicle communication device complying with Bluetooth and the electronic apparatus 10 can be confirmed, the in-vehicle determiner 430 determines that the location of the user 9 is "inside vehicle". In the meanwhile, when the completion of the pairing cannot be confirmed, the in-vehicle determiner 430 determines that the location of the user 9 is "outside vehicle".

The communication connection setting necessary to achieve the communication connection between the in-vehicle communication device complying with Wifi functioning as an access point and the electronic apparatus 10 is performed by inputting a security key (also referred to as a password or a cryptography key) allocated to the in-vehicle communication device to the electronic apparatus 10. When the wireless communication unit 110 receives a service set identifier (SSID) transmitted from the in-vehicle communication device complying with Wifi and the security key corresponding to the SSID is stored in the storage 103, the in-vehicle determiner 430 determines that the location of the user 9 is "inside vehicle". In the meanwhile, when the security key which is received by the wireless communication unit 110 and corresponds to the SSID transmitted from the in-vehicle communication device complying with Wifi is not stored in the storage 103, the in-vehicle determiner 430 determines that the location of the user 9 is "outside vehicle".

As described above, the in-vehicle determiner 430 determines whether or not the user 9 is in the vehicle based on whether or not the communication connection setting is performed on the electronic apparatus 10, thus the electronic apparatus 10 can determine more correctly whether or not the user 9 is in the vehicle.

<Second Example of In-Vehicle Determination: In-Vehicle Determination Based on Movement of Electronic Apparatus>

When the user 9 is not in the vehicle 6 owned by the user 9 but is in the vehicle 6 of the other person, there is a possibility that the communication connection setting necessary to achieve the communication connection between the electronic apparatus 10 of the user 9 and a communication device mounted on the vehicle 6 of the other person is not performed on the electronic apparatus 10. Thus, in the "first example of in-vehicle determination" described above, there is a possibility that the in-vehicle determiner 430 cannot appropriately determine that the user 9 is in the vehicle when the user 9 is in the vehicle 6 of the other person.

In the meanwhile, when the plurality of the users 9 are in the same vehicle 6, there is a high possibility that the plurality of the electronic apparatuses 10, which are held by the plurality of the users 9, moves similarly to each other.

Thus, in the present example, the in-vehicle determiner 430 included in the electronic apparatus 10 determines whether or not the user 9 of the electronic apparatus 10 is in the vehicle based on a movement of the other electronic apparatus 10, different from the electronic apparatus 10, which determines that the user 9 of the other electronic apparatus is in the vehicle and the movement of the electronic apparatus 10. Accordingly, the electronic apparatus 10 can correctly determine whether or not the user 9 is in the vehicle even when the communication connection setting is not performed.

The electronic apparatus 10 whose operation is to be described is referred to as "the subject apparatus 10" in some cases hereinafter. The user 9 of the host apparatus 10 is referred to as "the subject user 9" in some cases. The other electronic apparatus 10 different from the subject apparatus 10 is referred to as "the other apparatus 10" in some cases. The user 9 of the other apparatus 10 is referred to as "the other user 9" in some cases. The in-vehicle determiner 430 determines whether or not the subject user 9 is in the vehicle based on the movement 10 of the other apparatus 10 which determines the other user 9 is in the vehicle and the movement of the subject apparatus 10. The present example assumes a case where the stopping-movement specification of Step s2 is not executed as is the cases of FIGS. 7 to 9 described above.

The in-vehicle determination in the present example is based on a premise that the plurality of the electronic apparatuses 10 (the plurality of the electronic apparatuses 10 each owned by a driver and a passenger) located in the same vehicle 6 can communicate with each other using Bluetooth, for example. For example, the subject user 9 operates the display region 12 of the subject apparatus 10, thereby setting a pairing between the other apparatus 10 located in the same vehicle 6 as the subject apparatus 10 and the subject apparatus 10. Accordingly, the plurality of the electronic apparatuses 10 located in the same vehicle 6 can communicate with each other using Bluetooth.

In the present example, when the in-vehicle determiner 430 determines that the user 9 of the electronic apparatus 10 is in the vehicle, the electronic apparatus 10 notifies the other electronic apparatus 10 with which the electronic apparatus 10 can communicate, using Bluetooth, for example, of a timing of when the movement of the electronic apparatus 10 stops, that is to say, a movement-stop timing of the electronic apparatus 10 every time the electronic apparatus 10 stops traveling. The electronic apparatus 10 can specify the movement-stop timing of the electronic apparatus 10 based on the result of the stopping-movement specification in the stopping-movement specifying unit 410.

Figure 10:
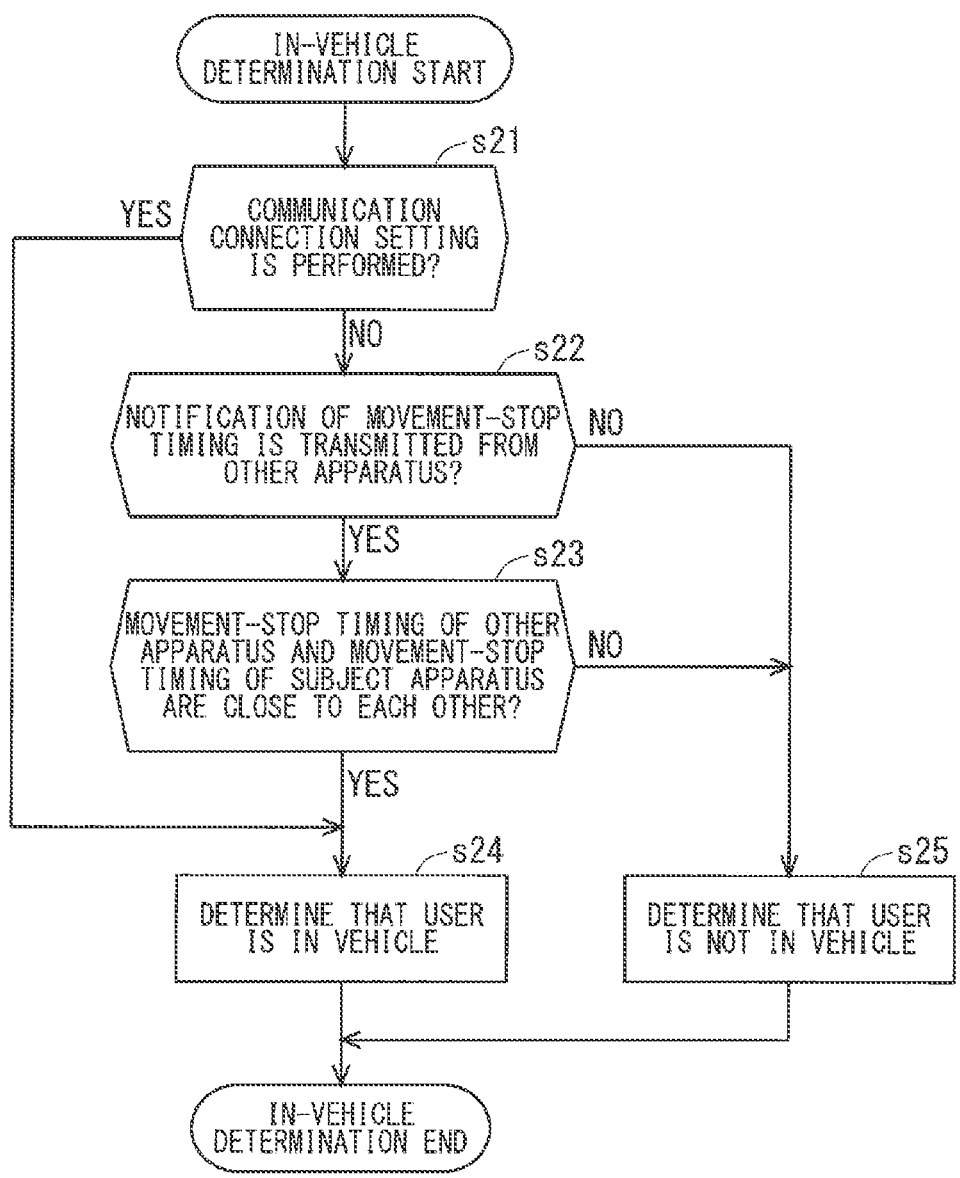
FIG. 10 illustrates a flow chart showing one example of an operation of the electronic apparatus.

FIG. 10 is a flow chart showing one example of the in-vehicle determination according to the present example. As illustrated in FIG. 10, in Step s21, the in-vehicle determiner 430 confirms whether or not the communication connection setting is performed on the subject apparatus 10 in the manner similar to the first example of the in-vehicle determination. The in-vehicle determiner 430 determines that the subject user 9 is in the vehicle in Step s24 when the communication connection setting is performed on the subject apparatus 10. When the subject user 9 is in the vehicle 6 owned by the subject user 9, it may be determined in Step s21 that the communication connection setting is performed on the subject apparatus 10.

In the meanwhile, when the communication connection setting is not performed on the subject apparatus 10, the in-vehicle determiner 430 determines in Step s22 whether or not the notification of the movement-stop timing is transmitted from the other apparatus 10 in which the other user 9 is determined to be in the vehicle. When the host user 9 is in the vehicle 6 of the other person, it may be determined in Step s21 that the communication connection setting is not performed on the subject apparatus 10.

When it is determined that the notification of the movement-stop timing is not transmitted from the other apparatus 10 in Step s22, the in-vehicle determiner 430 determines that the subject user 9 is not in the vehicle in Step s25. When the notification of the movement-stop timing is not transmitted from the other apparatus 10, in which the other user 9 is determined to be in the vehicle, to the subject apparatus 10, there is a high possibility that the subject apparatus 10 is located apart from the other apparatus 10. Accordingly, when it is determined that the notification of the movement-stop timing is not transmitted from the other apparatus 10 in Step s22, there is a high possibility that the subject user 9 is not in the vehicle.

In the meanwhile, when it is determined that the notification of the movement-stop timing is transmitted from the other apparatus 10, the in-vehicle determiner 430 determines whether or not the subject user 9 is in the vehicle based on the notified movement-stop timing and the movement-stop timing of the subject apparatus 10. The in-vehicle determiner 430 can specify the movement-stop timing of the electronic apparatus 10 based on the result of the stopping-movement specification in the stopping-movement specifying unit 410.

Herein, when the movement-stop timing of the other apparatus 10 in which the other user 9 is determined to be in the vehicle and the movement-stop timing of the subject apparatus 10 are close to each other, there is a high possibility that the subject user 9 is in the same vehicle 6 as the other user 9.

Thus, when it is determined that the notification of the movement-stop timing is transmitted from the other apparatus 10 in Step s22, the in-vehicle determiner 430 performs, in Step s23, a stop timing comparison whether or not a notification of a latest movement-stop timing transmitted from the other apparatus 10, in which the other user 9 is determined to be in the vehicle, and a latest movement-stop timing of the subject apparatus 10 are close to each other.

In the stop timing comparison, the in-vehicle determiner 430 determines whether or not a difference between the latest movement-stop timing of the other apparatus 10 and the latest movement-stop timing of the subject apparatus 10 is equal to or smaller than a first threshold value. Then, when the difference is determined to be equal to or smaller than the first threshold value, the in-vehicle determiner 430 determines that the latest movement-stop timing of the other apparatus 10 and the latest movement-stop timing of the subject apparatus 10 are close to each other. In the meanwhile, when the difference is determined to be larger than the first threshold value, the in-vehicle determiner 430 determines that the latest movement-stop timing of the other apparatus 10 and the latest movement-stop timing of the subject apparatus 10 are not close to each other.

In the present specification, a condition where a certain value is equal to or smaller than the threshold value can be replace with a condition where the certain value is smaller than the threshold value so far as consistent with the embodiments, and vice versa. A condition where a certain value is equal to or larger than the threshold value can be replace with a condition where the certain value is larger than the threshold value so far as consistent with the embodiments, and vice versa.

In the example described above, the in-vehicle determiner 430 determines that the latest movement-stop timing of the other apparatus 10 and the latest movement-stop timing of the subject apparatus 10 are close to each other when the difference therebetween is equal to or smaller than the first threshold value, and determines that the timings are not close to each other when the difference is larger than the first threshold value. When applied to the rule described above, it is also applicable that the in-vehicle determiner 430 determines that the latest movement-stop timing of the other apparatus 10 and the latest movement-stop timing of the subject apparatus 10 are close to each other when the difference therebetween is smaller than the first threshold value, and determines that the timings are not close to each other when the difference is equal to or larger than the first threshold value.

When it is determined in Step s23 that the movement-stop timing of the other apparatus 10 and the movement stop timing of the subject apparatus 10 are close to each other, the in-vehicle determiner 430 determines that the subject user 9 is in the same vehicle 6 as the other user 9, thereby determining that the subject user 9 is in the vehicle in Step s24. In the meanwhile, when it is determined that the movement-stop timing of the other apparatus 10 and the movement-stop timing of the subject apparatus 10 are not close to each other, the in-vehicle determiner 430 determines that the subject user 9 is not in the vehicle in Step s25.

The determination that the timings are "close" in the stop timing comparison means the determination that the both movement-stop timings are close to each other. The determination that the timings are "not close" in the stop timing comparison means the determination that the both movement-stop timings are not close to each other.

The in-vehicle determiner 430 may perform the stop timing comparison several times in Step s23. In this case, it is also applicable that the in-vehicle determiner 430 determines that the subject user 9 is in the vehicle when determining that the timings are "close" in each of the several stop timing comparisons, and does not determine that the subject user 9 is not in the vehicle when determining that the timings are "not close" in at least one of the several stop timing comparisons.

It is also applicable that, when the in-vehicle determiner 430 determines that the user 9 is in the vehicle, the electronic apparatus 10 notifies the other electronic apparatus 10 with which the electronic apparatus 10 can communicate of the timing of when the electronic apparatus 10 starts traveling, that is to say, the movement-start timing every time the movement of the electronic apparatus 10 starts, using Bluetooth, for example. In this case, the in-vehicle determiner 430 determines whether or not the notification of the movement-start timing is transmitted from the other apparatus 10 in Step s22. When the in-vehicle determiner 430 determines that the notification of the movement-start timing is not transmitted from the other apparatus 10 in Step s22, Step s25 is executed and it is determined that the subject user 9 is not in the vehicle. In the meanwhile, when it is determined in Step s22 that the notification of the movement-start timing is transmitted from the other apparatus 10, the in-vehicle determiner 430 performs, in Step s23, a start timing comparison whether or not a notification of a latest movement-start timing transmitted from the other apparatus 10, in which the other user 9 is determined to be in the vehicle, and a latest movement-start timing of the subject apparatus 10 are close to each other. The in-vehicle determiner 430 can specify the movement-start timing of the electronic apparatus 10 based on the result of the stopping-movement specification in the stopping-movement specifying unit 410. The in-vehicle determiner 430 can determine whether or not the both movement-start timings are close to each other by comparing a difference between the both movement-start timings and a second threshold value in the manner similar to the stop timing comparison, for example.

In the start timing comparison, the in-vehicle determiner 430 determines that the subject user 9 is in the same vehicle 6 as the other user 9 when determining that the both movement-start timings are close, and executes Step s24 to determine that the location of subject user 9 is "inside vehicle". In the meanwhile, when the in-vehicle determiner 430 determines that the both movement start timing are not close, the in-vehicle determiner 430 executes Step s25 to determine that the location of subject user 9 is "outside vehicle".

The determination that the timings are "close" in the start timing comparison means the determination that the both movement-start timings are close to each other hereinafter. The determination that the timings are "not close" in the start timing comparison means the determination that the both movement-start timings are not close to each other.

The in-vehicle determiner 430 may perform the start timing comparison several times in Step s23. In this case, it is applicable that the in-vehicle determiner 430 determines that the location of the user 9 is "inside vehicle" when determining that the timings are "close" in each of the several start timing comparisons, and does not determine that the location of the user 9 is "outside vehicle" when determining that the timings are "not close" in at least one of the several start timing comparisons.

It is also applicable that, when the in-vehicle determiner 430 determines that the user 9 is in the vehicle, the electronic apparatus 10 notifies the other electronic apparatus 10 with which the electronic apparatus 10 can communicate of both the movement stop timing of the electronic apparatus 10 and the movement start timing of the electronic apparatus 10 as the timing information, using Bluetooth, for example. In this case, the in-vehicle determiner 430 determines whether or not the notification of the timing information is transmitted from the other apparatus 10 in Step s22. When it is determined that the notification of the timing information is not transmitted from the other apparatus 10 in Step s22, Step s25 is executed. In the meanwhile, when it is determined that the notification of the timing information is transmitted from the other apparatus 10 in Step s22, the in-vehicle determiner 430 performs both the stop timing comparison and the start timing comparison in Step s23.

When the in-vehicle determiner 430 performs both the stop timing comparison and the start timing comparison in Step s23, the in-vehicle determiner 430 determines that the location of the user 9 is "inside vehicle" when determining that the timings are "close" in the stop timing comparison and the timings are "close" in the start timing comparison. In the meanwhile, the in-vehicle determiner 430 determines that the location of the user 9 is "outside vehicle" when determining that the timings are "not close" in the stop timing comparison and the timings are "not close" in the start timing comparison.

The in-vehicle determiner 430 may perform each of the stop timing comparison and the start timing comparison several times in Step s23. In this case, the in-vehicle determiner 430 determines that the location of the user 9 is "inside vehicle" when determining that the timings are "close" in the several stop timing comparisons and the timings are "close" in the several start timing comparisons. In the meanwhile, the in-vehicle determiner 430 determines that the location of the user 9 is "outside vehicle" when determining that the timings are "not close" in at least one of the several stop timing comparisons and the timings are "not close" in at least one of the several start timing comparisons.

In the in-vehicle determination described above, the movement-stop timing or the movement-start timing is used as the information indicating the movement of the electronic apparatus 10, however, a vibration of the electronic apparatus 10 may be used. In this case, the in-vehicle determiner 430 may determine whether or not the subject user 9 is in the vehicle based on the vibration of the subject apparatus 10 and the vibration of the other apparatus 10 in which the other user 9 is determined to be in the vehicle. In this example, the electronic apparatus 10 in which the user 9 is determined to be in the vehicle notifies the other electronic apparatus 10, with which the electronic apparatus 10 can communicate, of the pattern of the time change of the acceleration detected by the accelerometer 200 when the electronic apparatus 10 is traveling (also referred to as "the movement acceleration pattern" in some cases hereinafter) using Bluetooth, for example. Then, in Step s22, the in-vehicle determiner 430 determines whether or not the notification of the movement acceleration pattern indicating the vibration of the other apparatus 10 is transmitted from the other apparatus 10. When it is determined that the notification of the movement acceleration pattern is not transmitted from the other apparatus 10 in Step s22, Step s25 is executed. In the meanwhile, when it is determined that the notification of the movement acceleration pattern is transmitted from the other apparatus 10 in Step s22, the in-vehicle determiner 430 performs, in Step s23, a pattern comparison of comparing the movement acceleration pattern, the notification of which is transmitted from the other apparatus 10, in which the other user 9 is determined to be in the vehicle, and the pattern of the time change of the acceleration detected by the accelerometer 200 when the subject apparatus 10 is traveling (the movement acceleration pattern).

Herein, when the movement acceleration pattern in the other apparatus 10, in which the other user 9 is determined to be in the vehicle, and the movement acceleration pattern in the subject apparatus 10 are similar to each other, the subject user 9 has a high possibility of being in the same vehicle 6 as the other user 9. Thus, in the pattern comparison, the in-vehicle determiner 430 determines whether or not the movement acceleration pattern, the notice of which is transmitted from the other apparatus 10 in which the other user 9 is determined to be in the vehicle, and the movement acceleration pattern in the subject apparatus 10 are similar to each other. The in-vehicle determiner 430 determines that the subject user 9 is in the same vehicle 6 as the other user 9 when determining that the both movement acceleration patterns are similar to each other, and executes Step s24 to determine that the location of subject user 9 is "inside vehicle". In the meanwhile, when the in-vehicle determiner 430 determines that the both movement acceleration patterns are not similar to each other, the in-vehicle determiner 430 executes Step s25 and determines that the location of subject user 9 is "outside vehicle". It can be determined whether or not the two movement acceleration patterns are similar to each other based on an amplitude and cycle of the two movement acceleration patterns.

As described above, the in-vehicle determiner 430 determines whether or not the subject user 9 is in the vehicle based on the movement of the other apparatus 10 in which the other user 9 is determined to be in the vehicle and the movement of the subject apparatus 10, thus the electronic apparatus 10 can determine whether or not the subject user 9 is in the vehicle also in the case where the subject user 9 rides the vehicle 6 of the other person, for example.

The determination that the pattern is "similar" in the pattern comparison means the determination that the both movement acceleration patterns are similar to each other. The determination that the pattern is "not similar" in the pattern comparison means the determination that the both movement acceleration patterns are not similar to each other.

The in-vehicle determiner 430 may determine whether or not the user 9 is in the vehicle based on at least one of the movement-stop timing and the movement-start timing and the movement acceleration pattern. In this case, for example, the in-vehicle determiner 430 performs the pattern comparison and at least one of the stop timing comparison and the start timing comparison.

The in-vehicle determiner 430 determines that the timings are "close" in the stop timing comparison when performing the stop timing comparison and the pattern comparison, and determines that the location of the subject user 9 is "inside vehicle" when determining that the patterns are "similar" in the pattern comparison. In the meanwhile, the in-vehicle determiner 430 determines that the location of the user 9 is "outside vehicle" when determining that the timings are "not close" in the stop timing comparison, and determines that the location of the user 9 is "outside vehicle" when determining that the patterns are "not similar" in the pattern comparison.

The in-vehicle determiner 430 determines that the timings are "close" in the start timing comparison when performing the start timing comparison and the pattern comparison, and determines that the location of the user 9 is "inside vehicle" when determining that the patterns are "similar" in the pattern comparison. In the meanwhile, the in-vehicle determiner 430 determines that the location of the user 9 is "outside vehicle" when determining that the timings are "not close" in the start timing comparison, and determines that the location of the user 9 is "outside vehicle" when determining that the patterns are "not similar" in the pattern comparison.

The in-vehicle determiner 430 determines that the timings are "close" in each of the stop timing comparison and the start timing comparison when performing the stop timing comparison, the start timing comparison, and the pattern comparison, and determines that the location of the user 9 is "inside vehicle" when determining that the patterns are "similar" in the pattern comparison. In the meanwhile, the in-vehicle determiner 430 determines that the location of the user 9 is "outside vehicle" when determining that the timings are "not close" in the stop timing comparison, determines that the location of the user 9 is "outside vehicle" when determining that the timings are "not close" in the start timing comparison, and determines that the location of the user 9 is "outside vehicle" when determining that the patterns are "not similar" in the pattern comparison.

<Third Example of In-Vehicle Determination: In-Vehicle Determination Based on Presence or Absence of Reception of Predetermined Information>

As described in the "second example of in-vehicle determination", when the user 9 is not in the vehicle 6 owned by the user 9 but is in the vehicle 6 of the other person, there is a possibility that the communication connection setting is not performed on the electronic apparatus 10 of the user 9. Thus, in the "first example of in-vehicle determination" described above, there is a possibility that the in-vehicle determiner 430 cannot appropriately determine that the user 9 is in the vehicle when the user 9 is in the vehicle 6 of the other person.

Thus, in the present example, the in-vehicle determiner 430 determines whether or not the user 9 is in the vehicle based on whether or not the wireless communication unit 110 receives the predetermined information transmitted from the in-vehicle communication device.

Considered, for example, is a case where device information transmitted from a communication device complying with at least one of Bluetooth and Wifi includes manufacturer information indicating a name of a manufacturing company of the communication device. In this case, the in-vehicle determiner 430 determines that the user 9 is in the vehicle when the manufacturer information included in the device information which the wireless communication unit 110 receives using Bluetooth or Wifi indicates an automobile company. That is to say, the in-vehicle determiner 430 determines that the user 9 is in the vehicle when the wireless communication unit 110 receives the manufacturer information indicating the automobile company. In the meanwhile, the in-vehicle determiner 430 determines that the user 9 is not in the vehicle when the manufacturer information which the wireless communication unit 110 receives using Bluetooth or Wifi indicates a manufacturing company other than the automobile company. That is to say, the in-vehicle determiner 430 determines that the user 9 is not in the vehicle when the wireless communication unit 110 does not receive the manufacturer information indicating the automobile company. The in-vehicle determiner 430 may determine that the user 9 is in the vehicle when the wireless communication unit 110 receives manufacturer information indicating a manufacturing company of a car navigation device, using Bluetooth or Wifi. The in-vehicle determiner 430 may determine that the user 9 is in the vehicle when the wireless communication unit 110 receives manufacturer information indicating a manufacturing company of a car audio device, using Bluetooth or Wifi. When the electronic apparatus 10 stores a list of automobile companies, a list of manufacturing companies of car navigation devices, or a list of manufacturing companies of car audio devices in the storage 103, the in-vehicle determiner 430 can determine whether or not the wireless communication unit 110 receives the manufacturer information indicating the automobile company, for example, based on the list.

Considered, for example, is a case where the device information transmitted from the in-vehicle communication device includes in-vehicle information indicating that the in-vehicle communication device is the communication device mounted on the vehicle. In this case, the in-vehicle determiner 430 determines that the user 9 in the vehicle when the wireless communication unit 110 receives the in-vehicle information using Bluetooth or Wifi. In the meanwhile, the in-vehicle determiner 430 determines that the user 9 is not in the vehicle when the wireless communication unit 110 does not receive the in-vehicle information using Bluetooth or Wifi.

As described above, the in-vehicle determiner 430 determines whether or not the user 9 is in the vehicle based on whether or not the wireless communication unit 110 receives the predetermined information transmitted from the in-vehicle communication device, thus the electronic apparatus 10 can correctly determine whether or not the user 9 is in the vehicle even when the communication connection setting is not performed.

<Fourth Example of In-Vehicle Determination: In-Vehicle Determination Based on State of Air Around Electronic Apparatus>

In the present example, the in-vehicle determiner 430 determines whether or not the user 9 is in the vehicle based on a state of air around the electronic apparatus 10.

The electronic apparatus 10 according to the present example comprises a sensor 260 detecting the condition of the air around the electronic apparatus 10 as illustrated in FIG. 11. The sensor 260 is a gas sensor detecting gas around the electronic apparatus 10 as the condition of the air around the electronic apparatus 10, for example. In the in-vehicle determination, the in-vehicle determiner 430 determines whether or not the user 9 is in the vehicle based on a detection result in the sensor 260. A semiconductor system or the other system may be applied to a system of the gas sensor.

Known herein is that a gas component contained in the air inside the vehicle 6 and a gas component contained in the air outside the vehicle 6 are different from each other in a type and a concentration. In the present example, the storage 103 stores the detection result in the sensor 260 in a case where the electronic apparatus 10 is in the vehicle 6 as vehicle gas information. The vehicle gas information is deemed to indicate the state of the air inside the vehicle 6. The in-vehicle determiner 430 obtains the detection result from the sensor 260 in the in-vehicle determination, and compares the obtained detection result and the vehicle gas information in the storage 103. Then, the in-vehicle determiner 430 determines that the user 9 is in the vehicle when the detection result in the sensor 260 and the vehicle gas information are similar to each other. In the meanwhile, the in-vehicle determiner 430 determines that the user 9 is not in the vehicle when the detection result in the sensor 260 and the vehicle gas information are not similar to each other. It can be determined whether or not the detection result in the sensor 260 and the vehicle gas information are similar to each other based on data of the type and the concentration of the gas component included therein.

An operation mode of the electronic apparatus 10 in the present example includes a gas information registration mode for registering the vehicle gas information in the electronic apparatus 10. When the electronic apparatus 10 is in the vehicle, the user 9 operates the display region 12, for example, to make the electronic apparatus 10 set the operation mode to the gas information registration mode. In the electronic apparatus 10 in the gas information registration mode, when the user 9 performs a predetermined operation on the display region 12, for example, the detection result in the sensor 260 is stored in the storage 103 as the vehicle gas information. Accordingly, the vehicle gas information is registered in the electronic apparatus 10. When the vehicle gas information is registered in the electronic apparatus 10, the user 9 operates the display region 12, for example, to make the electronic apparatus 10 cancel the gas information registration mode.

The electronic apparatus 10 may automatically register the vehicle gas information. For example, the controller 100 registers the detection result in the sensor 260, in the case where the stopping-movement specifying unit 410 specifies that the travel means is "conveying device", as the vehicle gas information in the storage 103. The controller 100 may update the vehicle gas information in the storage 103 at regular or odd intervals when the user 9 travels by "conveying device".

The sensor 260 may be an odor sensor detecting an odor around the electronic apparatus 10 as the condition of the air around the electronic apparatus 10. In this case, in the in-vehicle determination, the in-vehicle determiner 430 may determine whether or not the user 9 is in the vehicle based on whether or not the sensor 260 detects a specific odor. Examples of the specific odor include an odor of an air refresher provided in the vehicle, for example. In this example, the storage 103 stores a type of an odor detected by the sensor 260 in the case where the electronic apparatus 10 is in the vehicle as vehicle odor information. The in-vehicle determiner 430 determines in the in-vehicle determination whether or not the type of the odor detected by the sensor 260 and the vehicle odor information in the storage 103 coincide with each other. The in-vehicle determiner 430 determines that the user 9 is in the vehicle when the type of the odor detected by the sensor 260 and the vehicle odor information coincide with each other. In the meanwhile, the in-vehicle determiner 430 determines that the user 9 is not in the vehicle when the type of the odor detected by the sensor 260 and the vehicle odor information do not coincide with each other. The storage of the vehicle odor information in the storage 103, that is to say, the registration of the vehicle odor information in the electronic apparatus 10 may be performed by the user 9 operating the display region 12 in the manner similar to the registration of the vehicle gas information in the electronic apparatus 10, or may be automatically performed by the electronic apparatus 10.

When a bar-code indicating a type of an odor contained in an air refresher provided in the vehicle is shown on the air refresher, the type of the odor indicated by the bar-code may be registered in the electronic apparatus 10 as the vehicle odor information. The electronic apparatus 10 can read information from the bar-code, and store the read information in the storage 103 as the vehicle odor information.

As described above, the in-vehicle determiner 430 determines whether or not the user 9 is in the vehicle based on the condition of the air around the electronic apparatus 10, thus the electronic apparatus 10 can determine more correctly whether or not the user 9 is in the vehicle.

<Fifth Example of in-Vehicle Determination: In-Vehicle Determination Based on Type of Travel Means of User>

As illustrated in FIGS. 7 to 9 described above, when Step s2 is not executed, the in-vehicle determiner 430 may determine whether or not the user 9 is in the vehicle based on the type of the travel means of the user 9 specified by the stopping-movement specifying unit 410.

For example, the in-vehicle determiner 430 determines that the user 9 is in the vehicle when it is determined that the travel means of the user 9 is "conveying device" in the stopping-movement specification. In the meanwhile, the in-vehicle determiner 430 determines that the user 9 is not in the vehicle when it is determined that the travel means of the user 9 is "walking" in the stopping-movement specification. The in-vehicle determiner 430 determines that the user 9 is not in the vehicle when it is determined that the travel means of the user 9 is "running" in the stopping-movement specification. The in-vehicle determiner 430 determines that the user 9 is not in the vehicle when it is determined that the travel means of the user 9 is "bicycle" in the stopping-movement specification.

As described above, the in-vehicle determiner 430 determines whether or not the user 9 is in the vehicle based on the type of the travel means of the user 9 specified by the stopping-movement specifying unit 410, thus the electronic apparatus 10 can determine more correctly whether or not the user 9 is in the vehicle.

The five types of in-vehicle determinations according to the first to fifth examples are described above. It is also applicable that the in-vehicle determiner 430 performs two or more types of the in-vehicle determinations among the five types of the in-vehicle determinations as the tentative in-vehicle determinations in Step s4 described above, and finally determines whether or not the user 9 is in the vehicle based on the result of the tentative in-vehicle determinations.

For example, the in-vehicle determiner 430 finally determines that the user 9 is in the vehicle when determining that the location of the user 9 is "inside vehicle" in at least one type of the tentative in-vehicle determination among the two or more types of the tentative in-vehicle determinations which have been executed. Then, the in-vehicle determiner 430 finally determines that the user 9 is not in the vehicle when determining that the location of the user 9 is "outside vehicle" in all of the two or more types of tentative in-vehicle determinations which have been executed. When the in-vehicle determiner 430 tentatively performs the in-vehicle determinations according to the second and third examples, for example, the in-vehicle determiner 430 is deemed to determine whether or not the user 9 is in the vehicle based on the movement of the other apparatus 10 in which the other user 9 is determined to be in the vehicle, the movement of the subject apparatus 10, and whether or not the wireless communication unit 110 of the subject apparatus 10 receives the predetermined information transmitted from the in-vehicle communication device. When the in-vehicle determiner 430 tentatively performs the in-vehicle determinations according to the third and fourth examples, for example, the in-vehicle determiner 430 is deemed to determine whether or not the user 9 is in the vehicle based on the movement of the other apparatus 10 in which the other user 9 is determined to be in the vehicle, the movement of the subject apparatus 10, and the condition of the air around the subject apparatus 10.

<One Example of Alighting Determination>

The user 9 may get out of the vehicle 6 and be located outside the vehicle with the electronic apparatus 10 in the vehicle 6. In such a case, the electronic apparatus 10 is in the vehicle, thus there is a possibility in the in-vehicle determination described above that the user 9 is determined to be in the vehicle even though the user 9 is located outside the vehicle 6.

Thus, it is also applicable that the electronic apparatus 10 correctly determines that the user 9 gets out of the vehicle 6 even when the user 9 gets out of the vehicle 6 with the electronic apparatus 10 in the vehicle. FIG. 12 is a block diagram showing one example of a configuration of the controller 100 of the electronic apparatus in this case.

As illustrated in FIG. 12, the controller 100 comprises an opening-closing specifying unit 600 capable of specifying an opening and closing of a door of the vehicle 6. The state specifying unit 400 comprises an alighting specifying unit 460 capable of specifying the user 9 getting out of the vehicle 6. At least one of the opening-closing specifying unit 600 and the alighting specifying unit 460 may be achieved by a hardware circuit that needs no software to achieve the functions above.

The opening-closing specifying unit 600 can specify the opening and closing of the door of the vehicle 6 based on the vibration of the electronic apparatus 10. The opening-closing specifying unit 600 can specify the opening and closing of the door of the vehicle 6 based on the acceleration indicating the vibration of the electronic apparatus 10 detected by the accelerometer 200, for example.

Herein, the vehicle 6 vibrates when the door of the vehicle 6 opens. At this time, when the electronic apparatus 10 is in the vehicle 6, the electronic apparatus 10 also vibrates. When the electronic apparatus 10 vibrates, the acceleration detected by the accelerometer 200 also changes. Accordingly, the opening-closing specifying unit 600 can specify that the door of the vehicle 6 opens based on the acceleration detected by the accelerometer 200.

In the similar manner, the vehicle 6 vibrates when the door of the vehicle 6 closes. At this time, when the electronic apparatus 10 is in the vehicle 6, the electronic apparatus 10 also vibrates. When the electronic apparatus 10 vibrates, the acceleration detected by the accelerometer 200 also changes. Accordingly, the opening-closing specifying unit 600 can specify that the door of the vehicle 6 closes based on the acceleration detected by the accelerometer 200.

The alighting specifying unit 460 determines that the user 9 gets out of the vehicle 6 when the stopping-movement specifying unit 410 specifies that the movement of the electronic apparatus 10 stops in the case where the in-vehicle determiner 430 determines that the user 9 is in the vehicle, and then the opening-closing specifying unit 600 specifies that the door of the vehicle 6 opens, and subsequently the opening-closing specifying unit 60X) specifies that the door of the vehicle 6 closes. That is to say, the alighting specifying unit 460 determines that the user 9 gets out of the vehicle 6 when the movement of the electronic apparatus 10 stops in the case where the user 9 is in the vehicle, and subsequently, the door of the vehicle 6 opens and then closes. Accordingly, even when the user 9 gets out of the vehicle 6 with the electronic apparatus 10 in the vehicle, the electronic apparatus 10 can correctly specify that the user 9 gets out of the vehicle 6.

When the alighting specifying unit 460 determines that the user 9 gets out of the vehicle 6 and the electronic apparatus 10 is located in the predetermined region, the notification determiner 500 determines "notification execution". In the meanwhile, even in the case where the alighting specifying unit 460 determines that the user 9 gets out of the vehicle 6, the notification determiner 500 determines "notification non-execution" when the electronic apparatus 10 is not located in the predetermined region. It is also applicable that the notification determiner 500 determines "notification execution" when the alighting specifying unit 460 determines that the user 9 gets out of the vehicle 6 regardless of whether or not the electronic apparatus 10 is located in the predetermined region.

It is also applicable that the alighting specifying unit 460 determines that the user 9 gets out of the vehicle 6 when the stopping-movement specifying unit 410 specifies that the movement of the electronic apparatus 10 stops in the case where the in-vehicle determiner 430 determines that the user 9 is in the vehicle, and then the opening-closing specifying unit 600 specifies that the door of the vehicle 6 opens. In this case, the opening-closing specifying unit 600 needs not specify that the door of the vehicle 6 closes.

It is also applicable that the alighting specifying unit 460 determines that the user 9 gets out of the vehicle 6 when the stopping-movement specifying unit 410 specifies that the movement of the electronic apparatus 10 stops in the case where the in-vehicle determiner 430 determines that the user 9 is in the vehicle, and then the opening-closing specifying unit 600 specifies that the door of the vehicle 6 closes. In this case, the opening-closing specifying unit 600 needs not specify that the door of the vehicle 6 open.

As described above, in the present example, the alighting specifying unit 460 determines that the user 9 gets out of the vehicle when it is specified that the movement of the electronic apparatus 10 stops in the case where the user 9 is determined to be in the vehicle, and then at least one of the opening and closing of the door of the vehicle 6 is specified. In other words, the alighting specifying unit 460 determines that the user 9 gets out of the vehicle when the state of the electronic apparatus 10 changes from the traveling state to the stopping state in the case where the user 9 is in the vehicle, and then at least one of the opening and closing of the door of the vehicle 6 is specified. Accordingly, the electronic apparatus 10 can correctly specify the alighting of the user 9 from the vehicle 6.

Even in the case where the user 9 gets out of the vehicle 6 with the electronic apparatus 10, there is a high possibility that the electronic apparatus 10 held by the user 9 vibrates when the door of the vehicle 6 opens and closes. Accordingly, even when the user 9 gets out of the vehicle 6 with the electronic apparatus 10, the electronic apparatus 10 can correctly specify that the user 9 gets out of the vehicle 6.

When the user 9 gets out of the vehicle 6 with the electronic apparatus 10 and performs the self traveling, the stopping-movement specifying unit 410 of the electronic apparatus 10 specifies that the user 9 performs the self traveling. Thus, the alighting specifying unit 460 may determine that the user 9 gets out of the vehicle 6 when the stopping-movement specifying unit 410 specifies that the movement of the electronic apparatus 10 stops in the case where the user 9 is determined to be in the vehicle, and then specifies that the user 9 performs the self traveling. Accordingly, the electronic apparatus 10 can specify that the user 9 gets out of the vehicle 6 more correctly when the user 9 gets out of the vehicle 6 with the electronic apparatus 10.

When the vehicle 6 can notify the electronic apparatus 10 in the vehicle 6 of opening-closing information of the door of the vehicle 6 using Bluetooth, for example, the alighting specifying unit 460 may specify that the user 9 gets out of the vehicle 6 based on the opening-closing information of the door notified by the vehicle 6. For example, the alighting specifying unit 460 may determine that the user 9 gets out of the vehicle 6 when it is specified that the movement of the electronic apparatus 10 stops in the case where the user 9 is determined to be in the vehicle, and then the vehicle 6 notifies that the door of the vehicle 6 opens. The alighting specifying unit 460 may also determine that the user 9 gets out of the vehicle 6 when it is specified that the movement of the electronic apparatus 10 stops in the case where the user 9 is determined to be in the vehicle, and then the vehicle 6 notifies that the door of the vehicle 6 closes. The alighting specifying unit 460 may also determine that the user 9 gets out of the vehicle 6 when it is specified that the movement of the electronic apparatus 10 stops in the case where the user 9 is determined to be in the vehicle, then the vehicle 6 notifies that the door of the vehicle 6 opens and subsequently closes.

As described above, when it is specified that the movement of the electronic apparatus 10 stops in the case where the user 9 is determined to be in the vehicle, and then the vehicle 6 transmits the notification of at least one of the opening and closing of the door, the alighting specifying unit 460 determines that the user 9 gets out of the vehicle 6, thus the electronic apparatus 10 can correctly specify that the user 9 gets out of the vehicle 6.

<One Example of Indoor Determination>

Details of the indoor determination are described next. Examples of a plural types of the indoor determinations are described hereinafter.

<First Example of Indoor Determination: Usage of Change in Reception Condition and Movement of User>

When the user 9 moves inside from outside, there is a high possibility that a reception condition of the receiver 140 deteriorates. When the user 9 moves outside from inside, there is a high possibility that the reception condition of the receiver 140 improves. Accordingly, it can be determined correctly to some extent whether or not the user 9 is located indoors based on the change in the reception condition of the receiver 140.

However, even in the case where the user 9 is located outdoors, the reception state of the receiver 140 may change when the user 9 temporarily passes through a tunnel or under a bridge or eaves are temporarily located above the user 9, for example. Accordingly, there is a possibility of an erroneous determination when it is determined whether or not the user 9 is located indoors based on only the change in the reception state of the receiver 140.

Thus, the indoor determiner 440 according to the present example determines whether or not the user 9 is located indoors based on the change in the reception condition of the receiver 140 and the movement information indicating the movement of the user 9 obtained by the movement information acquisition unit 420. Accordingly, the electronic apparatus 10 can determine whether or not the user 9 is located indoors more correctly.

The movement information includes at least one of a continuous stopping time of the user 9, a continuous walking time of the user 9, a continuous walking step number of the user 9, and a traveling direction of the user 9, for example. Herein, the continuous stopping time of the user 9 indicates a time when the user 9 continuously stops. Herein, the continuous walking time of the user 9 indicates a time when the user 9 continuously walks. The continuous walking step number of the user 9 indicates the number of steps from the start of walking in a case where the user 9 continuously walks. Described hereinafter are the indoor determination based on the continuous stopping time of the user 9, the indoor determination based the continuous walking time of the user 9, the indoor determination based on the continuous walking step number of the user 9, and the indoor determination based on the traveling direction of the user 9. The simple term "the reception condition" means the reception condition of the receiver 140 hereinafter.

<One Example of Indoor Determination Based on Continuous Stopping Time of User>

When the user 9 is located indoors, the user 9 has a high possibility of continuously stopping for a long time. Thus, the indoor determiner 440 determines whether or not the user 9 is located indoors based on the change in the reception condition and the continuous stopping time of the user 9, for example. FIG. 13 is a flow chart showing one example of the indoor determination in this case.

As illustrated in FIG. 13, the indoor determiner 440 confirms a result of a previous indoor determination in Step s31. When the indoor determiner 440 determines that the location of the user 9 is "outdoor" in the previous indoor determination, that is to say, when the indoor determiner 440 determines that the user 9 is located outdoors, the indoor determiner 440 determines whether or not the reception condition deteriorates in a predetermined period of time in Step s32. Upon determining that the reception condition deteriorates in the predetermined period of time, the indoor determiner 440 confirms (monitors) in a predetermined period of time whether the continuous stopping time of the user 9 is equal to or larger than a third threshold value in a state where the reception state deteriorates in Step s33. In the meanwhile, when the indoor determiner 440 determines that the reception condition does not deteriorate in the predetermined period of time, the indoor determiner 440 determines that the user 9 is not located indoors in Step s36.

When the indoor determiner 440 can confirm in a predetermined period of time that the continuous stopping time of the user 9 is equal to or larger than the third threshold value in the state where the reception condition deteriorates in Step s33, the indoor determiner 440 determines that the location of the user 9 is "indoor" in Step s34. In the meanwhile, when the indoor determiner 440 cannot confirm in a predetermined period of time that the continuous stopping time of the user 9 is equal to or larger than the third threshold value in the state where the reception condition deteriorates, the indoor determiner 440 determines that the location of the user 9 is "outdoor" in Step s36.

The third threshold value is set to a value larger than ten seconds, for example. The indoor determiner 440 can obtain the continuous stopping time of the user 9 based on the result of the stopping-movement specification in the stopping-movement specifying unit 410.

The indoor determiner 440 determines that the reception condition deteriorates when a latest number of captured satellites obtained by the receiver 140 is smaller than the number of captured satellites which has been previously obtained, and an absolute value of a difference between the both numbers of the captured satellites is equal to or larger than a fourth threshold value. The fourth threshold value is set to three or larger, for example. A C/N value of the received signal in the receiver 140 may be adopted instead of the number of the captured satellites. The C/N value expresses a ratio of a carrier power to a noise power, and indicates a reception quality. The receiver 140 can calculate the C/N value of the received signal and output the calculated C/N value to the controller 100. The indoor determiner 440 determines that the reception condition deteriorates when a latest C/N value obtained by the receiver 140 is smaller than a C/N value which has been previously obtained, and an absolute value of a difference between the both C/N values is equal to or larger than a fifth threshold value. The fifth threshold value is set to ten or larger, for example.

When the indoor determiner 440 determines that the location of the user 9 is "indoor" in the previous indoor determination as a result of the confirmation of the result of the previous indoor determination in Step s31, that is to say, when the indoor determiner 440 determines that the user 9 is located indoors, the indoor determiner 440 confirms whether the reception condition improves in the predetermined period of time in Step s35. When the indoor determiner 440 determines that the reception condition improves in the predetermined period of time, the indoor determiner 440 determines that the location of the user 9 is "indoor". In the meanwhile, when the indoor determiner 440 cannot confirm that the reception condition improves in the predetermined period of time, that is to say, when the reception condition has not improved in the predetermined period of time, the indoor determiner 440 determines that the location of the user 9 is "indoor".

The indoor determiner 440 determines that the reception condition improves when a latest number of captured satellites obtained by the receiver 140 is larger than the number of captured satellites which has been previously obtained, and an absolute value of a difference between the both numbers of captured satellites is equal to or larger than a sixth threshold value. The sixth threshold value is set to three or larger, for example. A C/N value of the received signal in the receiver 140 may be adopted instead of the number of the captured satellites.

As described above, the indoor determiner 440 determines whether or not the user 9 is located indoors based on the change in the reception condition and the continuous stopping time of the user 9, thus the electronic apparatus 10 can correctly determine whether or not the user 9 is located indoors.

The confirmation performed during the predetermined period of time whether the continuous stopping time of the user 9 is equal to or larger than the third threshold value in the state where the reception condition deteriorates is referred to as "stopping time confirmation in the deteriorating state" in some cases hereinafter. The term "'stopping time: large' is confirmed in the stopping time confirmation in the deteriorating state" means that it is confirmed in the predetermined period of time that the continuous stopping time of the user 9 is equal to or larger than the third threshold value in the state where the reception condition deteriorates. The term "'stopping time: large' is not confirmed in the stopping time confirmation in the deteriorating state" means that it is not confirmed in the predetermined period of time that the continuous stopping time of the user 9 is equal to or larger than the third threshold value in the state where the reception condition deteriorates.

<One Example of Indoor Determination Based on Continuous Stopping Time of User>

When the user 9 is located indoors, there is a low possibility that the continuous walking time of the user 9 is large. Thus, the indoor determiner 440 determines whether or not the user 9 is located indoors based on the change in the reception condition and the continuous walking time of the user 9, for example. In this case, the indoor determiner 440 confirms for a predetermined period of time whether the continuous walking time of the user 9 is equal to or larger than a seventh threshold value in the state where the reception state deteriorates in Step s33. When the indoor determiner 440 can confirm in a predetermined period of time that the continuous walking time of the user 9 is equal to or larger than the seventh threshold value in the state where the reception state deteriorates, the indoor determiner 440 executes Step s36 and determines that the location of the user 9 is "outdoor". In the meanwhile, when the indoor determiner 440 cannot confirm in a predetermined period of time that the continuous walking time of the user 9 is equal to or larger than the seventh threshold value in the state where the reception state deteriorates, the indoor determiner 440 executes Step s34 and determines that the location of the user 9 is "indoor". The seventh threshold value is set to five to ten seconds, for example. The indoor determiner 440 can obtain the continuous walking time of the user 9 based on the result of the stopping-movement specification in the stopping-movement specifying unit 410. The other processing of the indoor determination of the present example may be similar to the example in FIG. 13.

As described above, the indoor determiner 440 determines whether or not the user 9 is located indoors based on the change in the reception condition and the continuous walking time of the user 9, thus the electronic apparatus 10 can correctly determine whether or not the user 9 is located indoors.

The confirmation performed during the predetermined period of time whether the continuous walking time of the user 9 is equal to or larger than the seventh threshold value in the state where the reception condition deteriorates is referred to as "walking time confirmation in the deteriorating state" in some cases hereinafter. The term "'walking time: large' is confirmed in the walking time confirmation in the deteriorating state" means that it is confirmed in the predetermined period of time that the continuous walking time of the user 9 is equal to or larger than the seventh threshold value in the state where the reception condition deteriorates. The term "'walking time: large' is not confirmed in the walking time confirmation in the deteriorating state" means that it is not confirmed in the predetermined period of time that the continuous walking time of the user 9 is equal to or larger than the seventh threshold value in the state where the reception condition deteriorates.

<One Example of Indoor Determination Based on Continuous Walking Step Number of User>

When the user 9 is located indoors, there is a low possibility that the continuous walking step number of the user 9 is large. Thus, the indoor determiner 440 determines whether or not the user 9 is located indoors based on the change in the reception condition and the continuous walking step number of the user 9, for example. In this case, the indoor determiner 440 confirms for a predetermined period of time whether the continuous walking step number of the user 9 is equal to or larger than an eighth threshold value in the state where the reception state deteriorates in Step s33. When the indoor determiner 440 can confirm in the predetermined period of time that the continuous walking step number of the user 9 is equal to or larger than the eighth threshold value in the state where the reception state deteriorates, the indoor determiner 440 executes Step s36 and determines that the location of the user 9 is "outdoor". In the meanwhile, when the indoor determiner 440 cannot confirm in the predetermined period of time that the continuous walking step number of the user 9 is equal to or larger than the eighth threshold value in the state where the reception state deteriorates, the indoor determiner 440 executes Step s34 and determines that the location of the user 9 is "indoor". The eighth threshold value is set to five to ten, for example. The indoor determiner 440 can obtain the continuous walking step number of the user 9 based on the result of the stopping-movement specification in the stopping-movement specifying unit 410. The other processing of the indoor determination of the present example may be similar to the example in FIG. 13.

As described above, the indoor determiner 440 determines whether or not the user 9 is located indoors based on the change in the reception condition and the continuous walking step number of the user 9, thus the electronic apparatus 10 can correctly determine whether or not the user 9 is located indoors.

The confirmation performed during the predetermined period of time whether the continuous walking step number of the user 9 is equal to or larger than the eighth threshold value in the state where the reception condition deteriorates is referred to as "step number confirmation in the deteriorating state" in some cases hereinafter. The term "'step number: large' is confirmed in the step number confirmation in the deteriorating state" means that it is confirmed in the predetermined period of time that the continuous walking step number of the user 9 is equal to or larger than the eighth threshold value in the state where the reception condition deteriorates. The term "'step number: large' is not confirmed in the step number confirmation in the deteriorating state" means that it is not confirmed in the predetermined period of time that the continuous walking step number of the user 9 is equal to or larger than the eighth threshold value in the state where the reception condition deteriorates.

<One Example of Indoor Determination Based on Traveling Direction of User>

When the user 9 is located indoors, there is a low possibility that the traveling direction of the user 9 remains constant for a long time. Thus, the indoor determiner 440 determines whether or not the user 9 is located indoors based on the change in the reception condition and the traveling direction of the user 9, for example. In this case, the indoor determiner 440 confirms for a predetermined period of time whether the traveling direction of the user 9 does not change in the state where the reception state deteriorates in Step s33 described above. The indoor determiner 440 can specify the traveling direction of the user 9 based on a magnetic field detected by the geomagnetic sensor 230. When the indoor determiner 440 determines that the traveling direction of the user 9 does not change in a predetermined period of time in the state where the reception state deteriorates, the indoor determiner 440 executes Step s36 and determines that the location of the user 9 is "outdoor". In the meanwhile, when the indoor determiner 440 determines that the traveling direction of the user 9 changes in the predetermined period of time in the state where the reception state deteriorates, the indoor determiner 440 executes Step s34 and determines that the location of the user 9 is "indoor". The other processing of the indoor determination of the present example may be similar to the example in FIG. 13.

As described above, the indoor determiner 440 determines whether or not the user 9 is located indoors based on the change in the reception condition and the traveling direction of the user 9, thus the electronic apparatus 10 can correctly determine whether or not the user 9 is located indoors.

The confirmation whether the traveling direction of the user 9 does not change for the predetermined period of time in the state where the reception condition deteriorates is referred to as "traveling direction confirmation in the deteriorating state" in some cases hereinafter. The term "'no change' is confirmed in the traveling direction confirmation in the deteriorating state" means that it is confirmed that the traveling direction of the user 9 does not change in the predetermined period of time in the state where the reception condition deteriorates. The term "'no change' is not confirmed in the traveling direction confirmation in the deteriorating state" means that it is confirmed that the traveling direction of the user 9 changes in the predetermined period of time in the state where the reception condition deteriorates.

The indoor determiner 440 may determine whether or not the user 9 is located indoors based on the change in the reception condition and information of at least two of the continuous stopping time of the user 9, the continuous walking time of the user 9, the continuous walking step number of the user 9, and the traveling direction of the user 9.

For example, the indoor determiner 440 may determine whether or not the user 9 is located indoors based on the continuous stopping time of the user 9, the continuous walking time of the user 9, and the change in the reception condition by performing the stopping time confirmation in the deteriorating state and the walking time confirmation in the deteriorating state in Step s33. In this case, the indoor determiner 440 determines that the location of the user 9 is "indoor" when "stopping time: large" is confirmed in the stopping time confirmation in the deteriorating state and "walking time: large" is not confirmed in the walking time confirmation in the deteriorating state. In the meanwhile, the indoor determiner 440 determines that the location of the user 9 is "outdoor" when "stopping time: large" is not confirmed in the stopping time confirmation in the deteriorating state, and determines that the location of the user 9 is "outdoor" when "walking time: large" is confirmed in the walking time confirmation in the deteriorating state.

For example, the indoor determiner 440 may determine whether or not the user 9 is located indoors based on the continuous stopping time of the user 9, the continuous walking time of the user 9, the continuous walking step number of the user 9, and the change in the reception condition by performing the stopping time confirmation in the deteriorating state, the walking time confirmation in the deteriorating state, and the step number confirmation in the deteriorating state in Step s33. In this case, the indoor determiner 440 determines that the location of the user 9 is "indoor" when "stopping time: large" is confirmed in the stopping time confirmation in the deteriorating state, "walking time: large" is not confirmed in the walking time confirmation in the deteriorating state, and "step number: large" is not confirmed in the step number confirmation in the deteriorating state. In the meanwhile, the indoor determiner 440 determines that the location of the user 9 is "outdoor" when "stopping time: large" is not confirmed in the stopping time confirmation in the deteriorating state, and determines that the location of the user 9 is "outdoor" when "walking time: large" is confirmed in the walking time confirmation in the deteriorating state. The indoor determiner 440 determines that the location of the user 9 is "outdoor" when "step number: large" is confirmed in the step number confirmation in the deteriorating state.

For example, the indoor determiner 440 may determine whether or not the user 9 is located indoors based on the continuous stopping time of the user 9, the continuous walking time of the user 9, the continuous walking step number of the user 9, the traveling direction of the user 9, and the change in the reception condition by performing the stopping time confirmation in the deteriorating state, the walking time confirmation in the deteriorating state, the step number confirmation in the deteriorating state, and the traveling direction confirmation in the deteriorating state in Step s33. In this case, the indoor determiner 440 determines that the location of the user 9 is "indoor" when "stopping time: large" is confirmed in the stopping time confirmation in the deteriorating state, "walking time: large" is not confirmed in the walking time confirmation in the deteriorating state, "step number: large" is not confirmed in the step number confirmation in the deteriorating state, and "no change" is not confirmed in the traveling direction confirmation in the deteriorating state. In the meanwhile, the indoor determiner 440 determines that the location of the user 9 is "outdoor" when "stopping time: large" is not confirmed in the stopping time confirmation in the deteriorating state, and determines that the location of the user 9 is "outdoor" when "walking time: large" is confirmed in the walking time confirmation in the deteriorating state. The indoor determiner 440 determines that the location of the user 9 is "outdoor" when "step number: large" is confirmed in the step number confirmation in the deteriorating state, and determines that the location of the user 9 is "outdoor" when "no change" is confirmed in the traveling direction confirmation in the deteriorating state.

Even in the case where the user 9 is located indoors, the reception condition may improve when the user 9 is located near a window. Accordingly, as the example in FIG. 13 described above, when the indoor determiner 440 determines that the user 9 is located indoors, and subsequently determines that the location of the user 9 is "outdoor" in the case where the reception condition improves, there is a possibility that it is determined that the user 9 is not located indoors even when the user 9 is located indoors.

In the meanwhile, in the case where the user 9 is located indoors, a possibility that the continuous stopping time of the user 9 gets large and a possibility that the continuous walking time of the user 9 does not get large do not change even when the reception condition improves.

Thus, the indoor determiner 440 may specify that the user 9 gets outside based on the movement information when the indoor determiner 440 determines that the user 9 is located indoors and subsequently determines that the reception condition improves.

Figure 14:
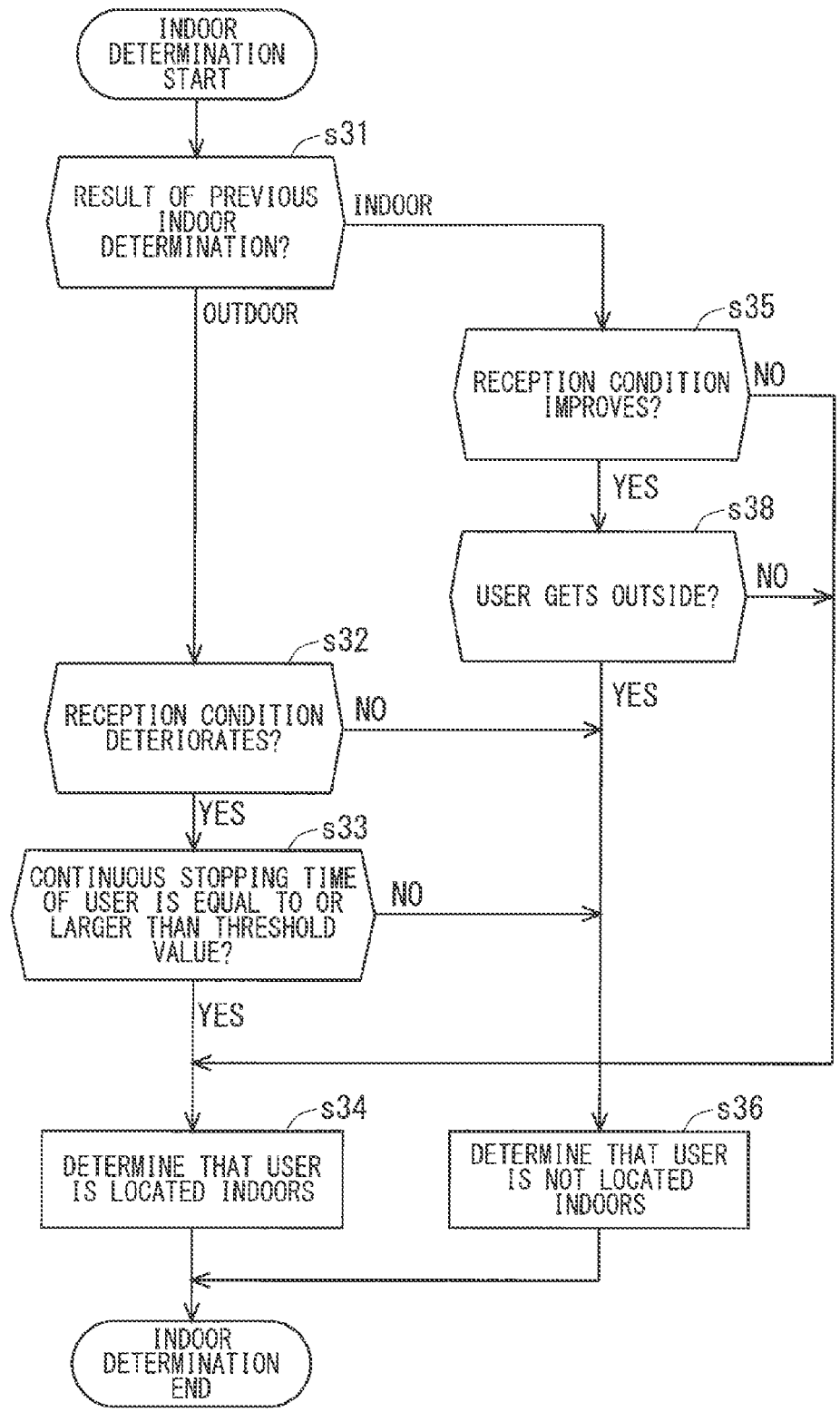
FIG. 14 illustrates a flow chart showing one example of an operation of the electronic apparatus.

For example, the indoor determiner 440 determines that the reception condition improves in the predetermined period of time in Step s35, and subsequently executes Step s38 as illustrated in FIG. 14. In Step s38, the indoor determiner 440 determines whether or not the user 9 gets outside based on the movement information. In Step s38, the indoor determiner 440 determines whether or not the user 9 gets outside based on the continuous stopping time of the user 9, for example. The indoor determiner 440 confirms for a predetermined period of time whether the continuous stopping time of the user 9 is equal to or larger than the third threshold value in the state where the reception condition improves, for example. This confirmation is referred to as "stopping time confirmation in the improving state" in some cases hereinafter. When the indoor determiner 440 cannot confirm in the predetermined period of time that the continuous stopping time of the user 9 is equal to larger than the third threshold value in the state where the reception condition improves, the indoor determiner 440 determines that the user 9 gets outside. Then, the indoor determiner 440 executes Step s36 and determines that the location of the user 9 is "outdoor". In the meanwhile, when the indoor determiner 440 can confirm in the predetermined period of time that the continuous stopping time of the user 9 is equal to larger than the third threshold value in the state where the reception condition improves, the indoor determiner 440 determines that the user 9 does not get outside. Then, the indoor determiner 440 executes Step s34 and determines that the location of the user 9 is "indoor".

The term "'stopping time: large' is confirmed in the stopping time confirmation in the improving state" means that it is confirmed in the predetermined period of time that the continuous stopping time of the user 9 is equal to or larger than the third threshold value in the state where the reception condition improves. The term "'stopping time: large' is not confirmed in the stopping time confirmation in the improving state" means that it is not confirmed in the predetermined period of time that the continuous stopping time of the user 9 is equal to or larger than the third threshold value in the state where the reception condition improves.

In Step s38, the indoor determiner 440 may determine whether or not the user 9 gets outside based on the continuous walking time of the user 9. In this case, the indoor determiner 440 confirms for the predetermined period of time whether the continuous walking time of the user 9 is equal to or larger than the seventh threshold value in the state where the reception condition improves, for example. This confirmation is referred to as "walking time confirmation in the improving state" in some cases. When the indoor determiner 440 can confirm in the predetermined period of time that the continuous walking time of the user 9 is equal to or larger than the seventh threshold value in the state where the reception condition improves, the indoor determiner 440 determines that the user 9 gets outside. In the meanwhile, when the indoor determiner 440 cannot confirm in the predetermined period of time that the continuous walking time of the user 9 is equal to or larger than the seventh threshold value in the state where the reception condition improves, the indoor determiner 440 determines that the user 9 does not get outside.

The term "'walking time: large' is confirmed in the walking time confirmation in the improving state" means that it is confirmed in the predetermined period of time that the continuous walking time of the user 9 is equal to or larger than the seventh threshold value in the state where the reception condition improves. The term "'walking time: large' is not confirmed in the walking time confirmation in the improving state" means that it is not confirmed in the predetermined period of time that the continuous walking time of the user 9 is equal to or larger than the seventh threshold value in the state where the reception condition improves.

In Step s38, the indoor determiner 440 may determine whether or not the user 9 gets outside based on the continuous walking step number of the user 9. In this case, the indoor determiner 440 confirms during the predetermined period of time whether the continuous walking step number of the user 9 is equal to or larger than the eighth threshold value in the state where the reception condition improves, for example. This confirmation is referred to as "step number confirmation in the improving state" in some cases. When the indoor determiner 440 can confirm in the predetermined period of time that the continuous walking step number of the user 9 is equal to larger than the eighth threshold value in the state where the reception condition improves, the indoor determiner 440 determines that the user 9 gets outside. In the meanwhile, when the indoor determiner 440 cannot confirm in the predetermined period of time that the continuous walking step number of the user 9 is equal to or larger than the eighth threshold value in the state where the reception condition improves, the indoor determiner 440 determines that the user 9 does not get outside.

The term "'step number: large' is confirmed in the step number confirmation in the improving state" means that it is confirmed in the predetermined period of time that the continuous walking step number of the user 9 is equal to or larger than the eighth threshold value in the state where the reception condition improves. The term "'step number: large' is not confirmed in the step number confirmation in the improving state" means that it is not confirmed in the predetermined period of time that the continuous walking step number of the user 9 is equal to or larger than the eighth threshold value in the state where the reception condition improves.

In Step s38, the indoor determiner 440 may determine whether or not the user 9 gets outside based on the traveling direction of the user 9. In this case, the indoor determiner 440 confirms for a predetermined period of time whether the traveling direction of the user 9 does not change in the state where the reception state improves, for example. This confirmation is referred to as "traveling direction confirmation in the improving state" in some cases. When the indoor determiner 440 confirms that the traveling direction of the user 9 does not change for a predetermined period of time in the state where the reception state improves, the indoor determiner 440 determines that the user 9 does not get outside. In the meanwhile, when the indoor determiner 440 determines that the traveling direction of the user 9 changes in a predetermined period of time in the state where the reception state improves, the indoor determiner 440 determines that the user 9 gets outside.

The term "'no change' is confirmed in the traveling direction confirmation in the improving state" means that it is confirmed that the traveling direction of the user 9 does not change in the predetermined period of time in the state where the reception condition improves. The term "'no change' is not confirmed in the traveling direction confirmation in the improving state" means that it is confirmed that the traveling direction of the user 9 changes in the predetermined period of time in the state where the reception condition improves.

In Step s38, the indoor determiner 440 may determine whether or not the user 9 gets outside based on information of at least two of the continuous stopping time of the user 9, the continuous walking time of the user 9, the continuous walking step number of the user 9, and the traveling direction of the user 9.

For example, the indoor determiner 440 may determine whether or not the user 9 gets outside based on the continuous stopping time of the user 9 and the continuous walking time of the user 9 by performing the stopping time confirmation in the improving state and the walking time confirmation in the improving state in Step s38. In this case, the indoor determiner 440 determines that the user 9 does not get outside when "stopping time: large" is confirmed in the stopping time confirmation in the improving state and "walking time: large" is not confirmed in the walking time confirmation in the improving state. In the meanwhile, the indoor determiner 440 determines that the user 9 gets outside when "stopping time: large" is not confirmed in the stopping time confirmation in the improving state, and determines that the user 9 gets outside when "walking time: large" is confirmed in the walking time confirmation in the improving state.

For example, the indoor determiner 440 may determine whether or not the user 9 gets outside based on the continuous stopping time of the user 9, the continuous walking time of the user 9, and the continuous walking step number of the user 9 by performing the stopping time confirmation in the improving state, the walking time confirmation in the improving state, and the step number confirmation in the improving state in Step s38. In this case, the indoor determiner 440 determines that the user 9 does not get outside when "stopping time: large" is confirmed in the stopping time confirmation in the improving state, "walking time: large" is not confirmed in the walking time confirmation in the improving state, and "step number: large" is not confirmed in the step number confirmation in the improving state. In the meanwhile, the indoor determiner 440 determines that the user gets outside when "stopping time: large" is not confirmed in the stopping time confirmation in the improving state, and determines that the user 9 gets outside when "walking time: large" is confirmed in the walking time confirmation in the improving state. The indoor determiner 440 determines that the user 9 gets outside when "step number: large" is confirmed in the step number confirmation in the improving state.

For example, the indoor determiner 440 may determine whether or not the user 9 gets outside based on the continuous stopping time of the user 9, the continuous walking time of the user 9, the continuous walking step number of the user 9, and the traveling direction of the user 9 by performing the stopping time confirmation in the improving state, the walking time confirmation in the improving state, the step number confirmation in the improving state, and the traveling direction confirmation in the improving state in Step s38.

In this case, the indoor determiner 440 determines that the user 9 does not get outside when "stopping time: large" is confirmed in the stopping time confirmation in the improving state, "walking time: large" is not confirmed in the walking time confirmation in the improving state, "step number: large" is not confirmed in the step number confirmation in the improving state, and "no change" is not confirmed in the traveling direction confirmation in the improving state. In the meanwhile, the indoor determiner 440 determines that the user gets outside when "stopping time: large" is not confirmed in the stopping time confirmation in the improving state, and determines that the user 9 gets outside when "walking time: large" is confirmed in the walking time confirmation in the improving state. The indoor determiner 440 determines that the user 9 gets outside when "step number: large" is confirmed in the step number confirmation in the improving state, and determines that the user 9 gets outside when "no change" is confirmed in the traveling direction confirmation in the improving state.

As described above, the indoor determiner 440 specifies that the user 9 gets outside based on the movement information when the indoor determiner 440 determines that the user 9 is located indoors and subsequently determines that the reception condition improves, thus the electronic apparatus 10 can specify that the user 9 gets outside more correctly.

<Second Example of Indoor Determination: Usage of Change in Reception Condition and Change in Height of Position of Electronic Apparatus>

The user 9 goes up to a second floor from a first floor or goes down to a basement from a first floor when the user 9 is located indoors, thus there is a high possibility that a height of a position of the electronic apparatus 10 changes.

Thus, the indoor determiner 440 may determine whether or not the user 9 is located indoors based on the change in the height of the position of the electronic apparatus 10 and the change in the reception condition.

In the present example, in Step s33 described above, the indoor determiner 440 confirms for a predetermined period of time whether the height of the position of the electronic apparatus 10 increases by a predetermined value or more in a state where the reception condition deteriorates, for example. The indoor determiner 440 confirms for a predetermined period of time whether the height of the position of the electronic apparatus 10 decreases by a predetermined value or more in a state where the reception condition deteriorates, for example. The indoor determiner 440 can determine whether or not the height of the position of the electronic apparatus 10 increases by the predetermined value or more based on a detection result in atmospheric pressure sensor 210. The indoor determiner 440 can determine whether or not the height of the position of the electronic apparatus 10 decreases by the predetermined value or more based on a detection result in atmospheric pressure sensor 210.

When the indoor determiner 440 confirms in a predetermined period of time that the height of the position of the electronic apparatus 10 increases by a predetermined value or more in a state where the reception condition deteriorates, the indoor determiner 440 executes Step s34 and determines that the location of the user 9 is "indoors". When the indoor determiner 440 confirms in a predetermined period of time that the height of the position of the electronic apparatus 10 decreases by a predetermined value or more in a state where the reception condition deteriorates, the indoor determiner 440 executes Step s34 and determines that the location of the user 9 is "indoors". In the meanwhile, when the indoor determiner 440 cannot confirm in the predetermined period of time that the height of the position of the electronic apparatus 10 increases by the predetermined value or more in the state where the reception condition deteriorates and also cannot confirm in the predetermined period of time that the height of the position of the electronic apparatus 10 decreases by the predetermined value or more in the state where the reception condition deteriorates, the indoor determiner 440 executes Step s36 and determines that the location of the user 9 is "outdoor".

As described above, the indoor determiner 440 determines whether or not the user 9 is located indoors based on the change in the height of the position of the electronic apparatus 10 and the change in the reception condition, thus the electronic apparatus 10 can correctly determine whether or not the user 9 is located indoors.

In Step s38 in FIG. 14 described above, the indoor determiner 440 may determine whether or not the user 9 gets outside based on the change in the height of the position of the electronic apparatus 10. In this case, the indoor determiner 440 confirms for a predetermined period of time whether the height of the position of the electronic apparatus 10 increases by a predetermined value or more in a state where the reception condition improves. The indoor determiner 440 confirms for a predetermined period of time whether the height of the position of the electronic apparatus 10 decreases by a predetermined value or more in a state where the reception condition improves. When the indoor determiner 440 confirms in a predetermined period of time that the height of the position of the electronic apparatus 10 increases by a predetermined value or more in a state where the reception condition improves, the indoor determiner 440 determines that the user 9 does not get outside. When the indoor determiner 440 confirms in a predetermined period of time that the height of the position of the electronic apparatus 10 decreases by a predetermined value or more in a state where the reception condition improves, the indoor determiner 440 determines that the user 9 does not get outside. In the meanwhile, when the indoor determiner 440 cannot confirm in a predetermined period of time that the height of the position of the electronic apparatus 10 increases by a predetermined value or more in a state where the reception condition improves, and also cannot confirm in a predetermined period of time that the height of the position of the electronic apparatus 10 decreases by a predetermined value or more in a state where the reception condition improves, the indoor determiner 440 determines that the user 9 gets outside.

As described above, the indoor determiner 440 specifies that the user 9 is located indoors and subsequently specifies that the user 9 gets outside based on the change in the height of the position of the electronic apparatus 10 and the change in the reception condition, thus the electronic apparatus 10 can specify that the user 9 gets outside more correctly.

<Third Example of Indoor Determination: Usage of Change in Reception Condition and Change in Condition Around Electronic Apparatus>

When the user 9 moves inside from outside, there is a high possibility that a condition around the electronic apparatus 10 changes. When the user 9 moves inside from outside, there is a high possibility that a temperature around the electronic apparatus 10 changes, for example. When the user 9 moves inside from outside, there is a high possibility that a magnetic field around the electronic apparatus 10 changes.

When the user 9 moves inside from outside, there is a high possibility that a condition of air around the electronic apparatus 10 changes.

Thus, the indoor determiner 440 may determine whether or not the user 9 is located indoors based on the change in the condition around the electronic apparatus 10 and the change in the reception condition. The indoor determiner 440 may determine whether or not the user 9 is located indoors based on the change in the reception condition and at least one of the changes in the temperature, the magnetic field, and the condition of the air around the electronic apparatus 10, for example.

Figure 15:
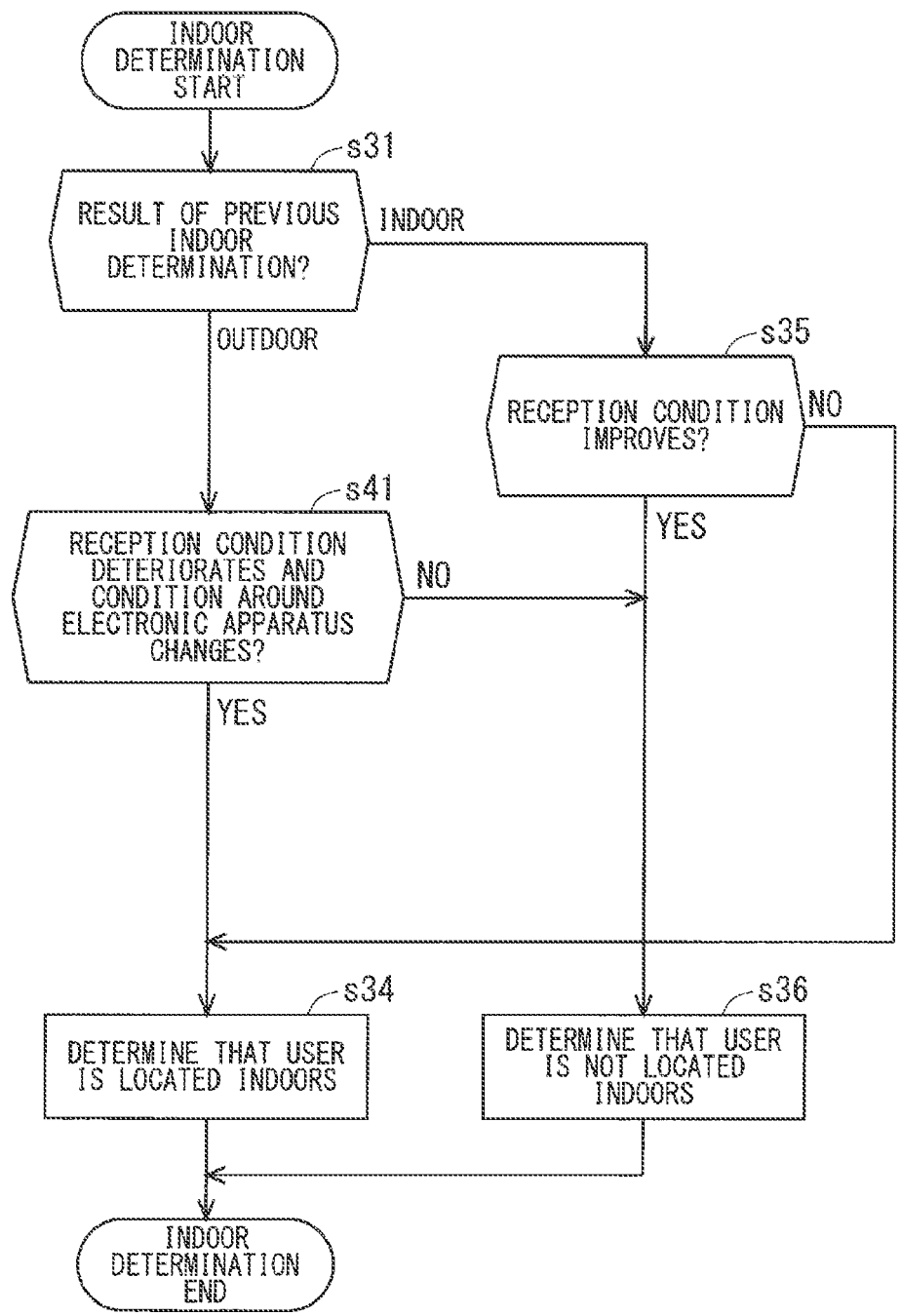
FIG. 15 illustrates a flow chart showing one example of an operation of the electronic apparatus.

FIG. 15 is a flow chart showing one example of the indoor determination according to the present example. In the flow chart in FIG. 15, Step s41 is executed instead of Steps s32 and s33 in the flow chart in FIG. 13.

As illustrated in FIG. 15, when it is determined that the location of the user 9 is "outdoor" in the previous indoor determination in Step s31, the indoor determiner 440 determines whether or not the user 9 is located indoors based on the change in the condition around the electronic apparatus 10 and the change in the reception condition in Step s41. In Step s41, for example, the indoor determiner 440 determines whether or not the reception condition deteriorates and the condition around the electronic apparatus 10 changes in the predetermined period of time. When the indoor determiner 440 determines that the reception condition deteriorates and the condition around the electronic apparatus 10 changes in the predetermined period of time, the indoor determiner 440 executes Step s34 and determines that the location of the user 9 is "Indoor". In the meanwhile, when the reception condition does not deteriorate and the condition around the electronic apparatus 10 does not change in the predetermined period of time, the indoor determiner 440 executes Step s36 and determines that the location of the user 9 is "outdoor".

The indoor determiner 440 may determine in Step s41 that the condition around the electronic apparatus 10 changes when the temperature around the electronic apparatus 10 increases by a predetermined value or more. The indoor determiner 440 may determine that the condition around the electronic apparatus 10 changes when the temperature around the electronic apparatus 10 decreases by a predetermined value or more. The indoor determiner 440 can determine whether or not the temperature around the electronic apparatus 10 increases by the predetermined value or more and decreases by a predetermined value or more based on a detection result in the temperature sensor 240.

The indoor determiner 440 may determine in Step s41 that the condition around the electronic apparatus 10 changes when the magnetic field around the electronic apparatus 10 increases by a predetermined value or more. The indoor determiner 440 may determine that the condition around the electronic apparatus 10 changes when a strength of the magnetic field around the electronic apparatus 10 decreases by a predetermined value or more. The indoor determiner 440 can determine whether or not the strength of the magnetic field around the electronic apparatus 10 increases by the predetermined value or more and decreases by a predetermined value or more based on a detection result in the geomagnetic sensor 230.

The indoor determiner 440 may determine in Step s41 that the condition around the electronic apparatus 10 changes when the condition of air around the electronic apparatus 10 changes. In this case, the indoor determiner 440 determines whether or not the condition of the air around the electronic apparatus 10 changes based on a detection result in the sensor 260 illustrated in FIG. 11 described above, for example. In a case where the sensor 260 is a gas sensor, for example, the indoor determiner 440 determines that the condition of the air around the electronic apparatus 10 changes when at least a type and concentration of gas detected by the sensor 260 significantly changes. In a case where the sensor 260 is an odor sensor, for example, the indoor determiner 440 determines that the condition of the air around the electronic apparatus 10 changes when at least a type and concentration of odor detected by the sensor 260 significantly changes.

The indoor determiner 440 may determine in Step s41 that the condition around the electronic apparatus 10 changes when the temperature around the electronic apparatus 10 increases or decreases by a predetermined value or more and the strength of the magnetic field around the electronic apparatus 10 increases or decreases by a predetermined value or more.

The indoor determiner 440 may determine in Step s41 that the condition around the electronic apparatus 10 changes when the temperature around the electronic apparatus 10 increases or decreases by a predetermined value or more and the condition of the air around the electronic apparatus 10 changes.

The indoor determiner 440 may determine in Step s41 that the condition around the electronic apparatus 10 changes when the temperature around the electronic apparatus 10 increases or decreases by a predetermined value or more, the strength of the magnetic field around the electronic apparatus 10 increases or decreases by a predetermined value or more, and the condition of the air around the electronic apparatus 10 changes.

The indoor determiner 440 may determine in Step s41 that the condition around the electronic apparatus 10 changes when the strength of the magnetic field around the electronic apparatus 10 increases or decreases by a predetermined value or more and the condition of the air around the electronic apparatus 10 changes.

As described above, the indoor determiner 440 determines whether or not the user 9 is located indoors based on the change in the condition around the electronic apparatus 10 and the change in the reception condition, thus the electronic apparatus 10 can determine whether or not the user 9 is located indoors more correctly.

Figure 16:
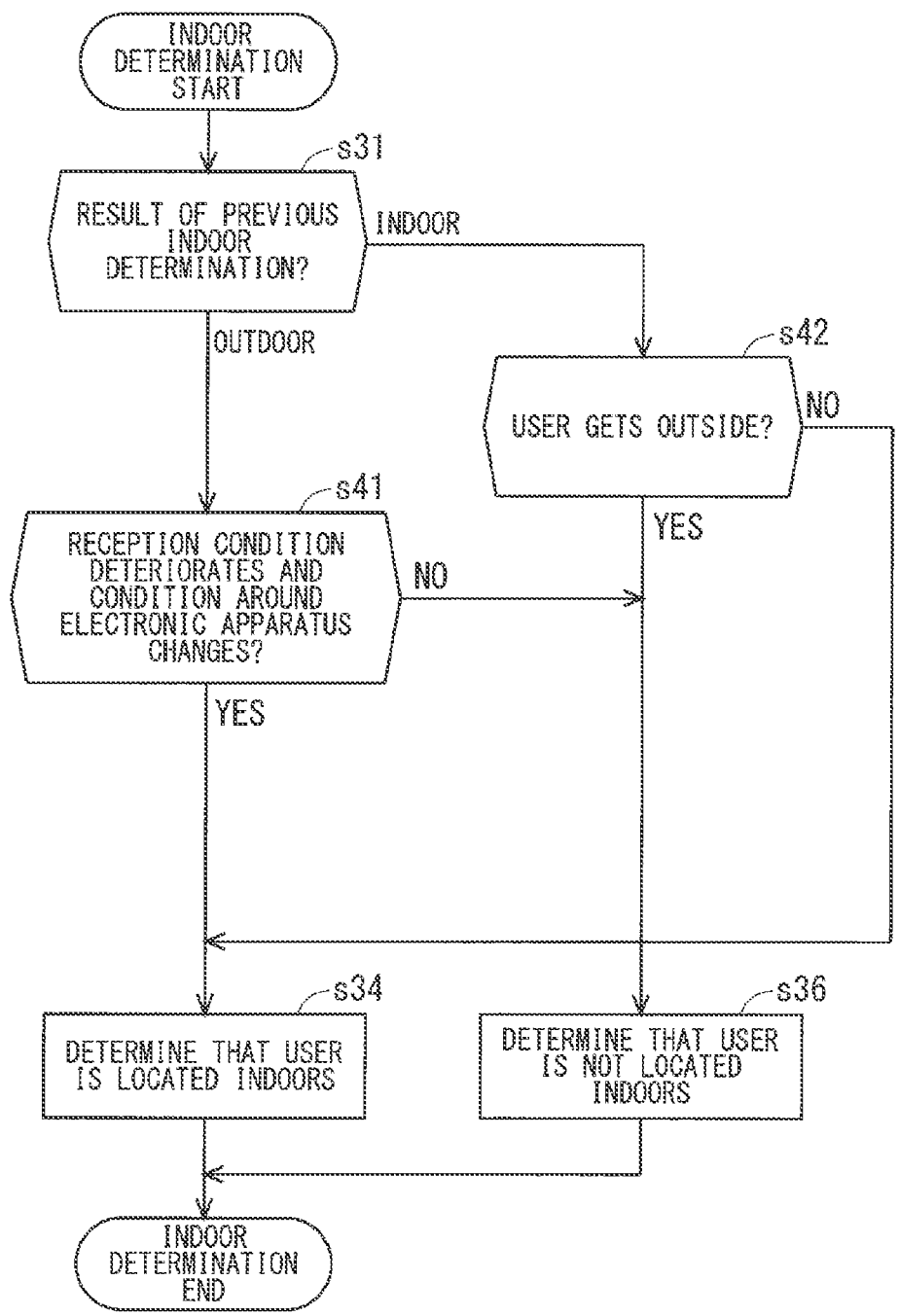
FIG. 16 illustrates a flow chart showing one example of an operation of the electronic apparatus.

The indoor determiner 440 may determine whether or not the user 9 gets outside based on the change in the condition around the electronic apparatus 10 in Step s42 instead of Step s35 described above. In the flow chart in FIG. 16, Step s42 is executed instead of Step s35 in the flow chart in FIG. 15.

In Step s42, the indoor determiner 440 determines whether or not the reception condition improves and the condition around the electronic apparatus 10 changes in the predetermined period of time. The indoor determiner 440 can determine whether or not the condition around the electronic apparatus 10 changes in the manner similar to Step s41. The indoor determiner 440 determines that the user 9 gets outside when it is determined that the reception condition improves and the condition around the electronic apparatus 10 changes in the predetermined period of time. Then, the indoor determiner 440 executes Step s36 and determines that the location of the user 9 is "outdoor". In the meanwhile, the indoor determiner 440 determines that the user 9 does not get outside when the reception condition improves and the condition around the electronic apparatus 10 does not change in the predetermined period of time.

Then, the indoor determiner 440 executes Step s34 and determines that the location of the user 9 is "indoor".

As described above, the indoor determiner 440 specifies that the user 9 is located indoors and subsequently specifies that the user 9 gets outside based on the change in the condition around the electronic apparatus 10 and the change in the reception condition, thus the electronic apparatus 10 can specify that the user 9 gets outside more correctly.

<Fourth Example of Indoor Determination: Indoor Determination Based on Behavior Pattern of User>

Figures 17, 18:
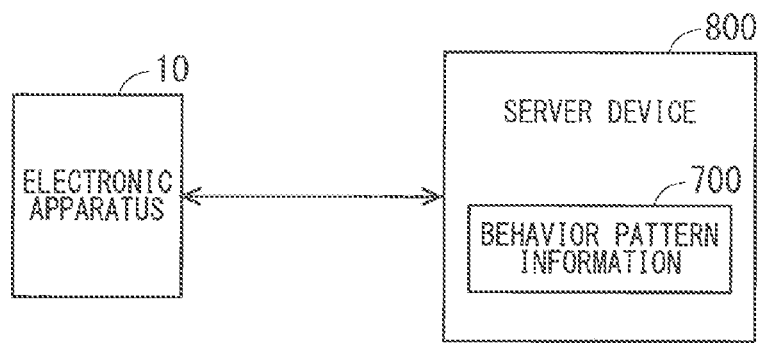
FIG. 17 illustrates a drawing showing one example of a communication between the electronic apparatus and a server device.
FIG. 18 illustrates a drawing illustrating one example of behavior pattern information.

In the present example, the indoor determiner 440 determines whether or not the user 9 is located indoors based on behavior pattern information 700 indicating a behavior pattern of the user 9. In the present example, as illustrated in FIG. 17, the electronic apparatus 10 can communicate with a server device 800 storing the behavior pattern information 700, using the wireless communication unit 110. The electronic apparatus 10 obtains the behavior pattern information 700 from the server device 800 in performing the indoor determination.

FIG. 18 is a drawing showing one example of the behavior pattern information 700. As illustrated FIG. 18, in the behavior pattern information 700, a probability (home ratio) that the user 9 is at home during each of a plurality of time periods in a weekday and a probability (home ratio) that the user 9 is at home during each of a plurality of time periods in a weekend are associated with each of the plurality of time period in one day. For example, in a time period after 12 a.m. before 3 a.m., the home ratio in the time period in the weekday is 90%, and the home ratio in the time period in the weekend is 90%. In a time period after 9 a.m. before 12 p.m., the home ratio in the time period in the weekday is 10%, and the home ratio in the time period in the weekend is 40%.

The indoor determiner 440 obtains the behavior pattern information 700 from the server device 800 in performing the indoor determination. Then, the indoor determiner 440 obtains the home ratio of a current day in a time period including a current time from the behavior pattern information 700. For example, when the current day is a weekday and the current time is 10 a.m., the indoor determiner 440 obtains 10% which is the home ratio in the weekday in the time period of 9 a.m. to 12 p.m. from the behavior pattern information 700. The indoor determiner 440 can obtain the current time and the current day from a real-time clock included in the electronic apparatus 10, for example. The home ratio obtained from the behavior pattern information 700 in the indoor determination is referred to as "the obtained home ratio" in some cases hereinafter.

The indoor determiner 440 determines whether or not the user 9 is located indoors based on the obtained home ratio. For example, the indoor determiner 440 determines that the user 9 is located indoors when the obtained home ratio is equal to or larger than 80%. In the meanwhile, the indoor determiner 440 determines that the user 9 is not located indoors when the obtained home ratio is smaller than 80%, for example.

In the example in FIG. 18, when the current time is 2 p.m. and the current day is a weekend, the obtained home ratio is 30%, and the indoor determiner 440 determines that the location of the user 9 is "outdoor". In the example in FIG. 18, when the current time is 5 a.m. and the current day is a weekday, the obtained home ratio is 80%, and the indoor determiner 440 determines that the location of the user 9 is "indoor".

The behavior pattern information 700 may be generated by the server device 800 or may also be generated by the electronic apparatus 10. The behavior pattern information 700 can be generated based on the positional information of the electronic apparatus 10, for example.

When the server device 800 generates the behavior pattern information 700, the electronic apparatus 10 transmits the positional information obtained in the receiver 140 to the server device 800 at regular intervals. The electronic apparatus 10 transmits home information indicating an address of a home of the user 9 to the server device 800. The server device 800 generates the behavior pattern information 700 based on the positional information and the home information received from the electronic apparatus 10. For example, when the server device 800 specifies that the user 9 is at home for eight of ten days in the weekday in a time period of 12 a.m. to three a.m. based on the positional information and the home information of the electronic apparatus 10, the server device 800 sets the home ratio in the weekday in the time period to 80%. The method of generating the behavior pattern information 700 is not limited thereto.

It is also applicable that the user 9 who is at home performs a predetermined operation on the electronic apparatus 10, thereby inputting home information indicating that the user 9 is at home to the electronic apparatus 10. In this case, the electronic apparatus 10 may generate the behavior pattern information 700 based on the home information which is input. The electronic apparatus 10 may notify the server device 80 of the home information which is input. In this case, the server device 800 may generate the behavior pattern information 700 based on the home information received from the electronic apparatus 10.

As described above, the indoor determiner 440 determines whether or not the user 9 is located indoors based on the behavior pattern information 700 indicating the behavior pattern of the user 9, thus the electronic apparatus 10 can determine whether or not the user 9 is located indoors more correctly.

The behavior pattern information 700 is not limited to the example in FIG. 18. The behavior pattern information 700 may include a probability (workplace ratio) that the user 9 is in a workplace during each time period in a weekday and weekend, for example. In this case, the indoor determiner 440 may obtain the workplace ratio in a current day in a time period including the current time and determine whether or not the user 9 is located indoors based on the obtained workplace ratio. For example, the indoor determiner 440 determines that the location of the user 9 is "indoor" when the obtained workplace ratio is equal to or larger than 80%, and determines that the location of the user 9 is "outdoor" when the obtained workplace ratio is smaller than 80%.

The indoor determiner 440 may determine whether or not the user 9 is located indoors based on the behavior pattern information 700 and the other piece of information. For example, the indoor determiner 440 may determine whether or not the user 9 is located indoors based on a connection condition of a communication between an access point of a Wifi provided in the home of the user 9 (referred to as "the home access point" hereinafter) and the wireless communication unit 110 and the behavior pattern information 700. The simple term "the connection condition" means the connection condition of the communication between the home access point and the wireless communication unit 110 hereinafter.

In the case where the indoor determiner 440 determines whether or not the user 9 is located indoors based on the behavior pattern information 700 and the connection condition, a weighting (degree of importance) at the time of determining whether or not the user 9 is located indoors is given to a value of the home ratio in the behavior pattern information 700, and the weighting is also given to a type of the connection condition, for example. The weighting is deemed to indicate certainty of the user located indoors derived from information associated thereto.

For example, when the home ratio is A %, the weighting thereof is set to A. Thus, when the home ratio is 90%, the weighting thereof is 90. In a case where the home access point and the wireless communication unit 110 have a stable communication connection with each other, the weighting is set to 90. In a case where the home access point and the wireless communication unit 110 have an unstable communication connection with each other, the weighting is set to 50. In a case where the home access point and the wireless communication unit 110 have no communication connection with each other, that is to say, in a case where they are unconnected, the weighting is set to 10.

The indoor determiner 440 obtains the home ratio corresponding to the current time and the current day from the behavior pattern information 700 in the indoor determination, and specifies the connection condition. Then, the indoor determiner 440 obtains an additional value of adding the weight corresponding to the obtained home ratio and the weight corresponding to the specified connection condition. The indoor determiner 440 determines that the location of the user 9 is "indoor" when the obtained additional value of the weights is equal to or larger than a ninth threshold value, and determines that the location of the user 9 is "outdoor" when the additional value is smaller than the ninth threshold value. The ninth threshold value is set to 120, for example.

For example, in a case where the obtained home ratio is 90% and it is specified that the home access point and the wireless communication unit 110 have the stable communication connection with each other (the weighting 90), the additional value of the weighting is 180. In this case, the location of the user 9 is determined to be "indoor". In a case where the obtained home ratio is 30% (the weighting 30) and it is specified that the home access point and the wireless communication unit 110 have no communication connection (the weighting 10), the additional value of the weighting is 40. In this case, the location of the user 9 is determined to be "outdoor". In a case where the obtained home ratio is 80% (the weighting 80) and it is specified that the home access point and the wireless communication unit 110 have the unstable communication connection (the weighting 50), the additional value of the weighting is 130. In this case, the location of the user 9 is determined to be "indoor".

The indoor determiner 440 may determine whether or not the user 9 is located indoors based on the result of the stopping-movement specification in the stopping-movement specifying unit 410 and the behavior pattern information 700. In this case, for example, the weighting is given to the value of the home ratio in the manner similar to the above description. The weighting of 90 is given to "stopping of the user 9" specified in the stopping-movement specification, and the weightings of 50 and 10 are given to "walking" and "running" which are the travel means of the user 9 specified in the stopping-movement specification, respectively. "Bicycle" and "conveying device" which are the travel means of the user 9 specified in the stopping-movement specification need not be used in the indoor determination.

The indoor determiner 440 obtains the home ratio corresponding to the current time and the current day from the behavior pattern information 700 in the indoor determination, and confirms the result of the stopping-movement specification. Then, the indoor determiner 440 obtains an additional value of adding the weight corresponding to the obtained home ratio and the weight corresponding to the content specified in the stopping-movement specification. The indoor determiner 440 determines that the location of the user 9 is "indoor" when the obtained additional value of the weights is equal to or larger than a tenth threshold value, and determines that the location of the user 9 is "outdoor" when the additional value is smaller than the tenth threshold value. The tenth threshold value is set to 120, for example.

For example, in a case where the obtained home ratio is 90% (the weighting 90) and "walking" is specified in the stopping-movement specification (the weighting 50), the additional value of the weighting is 140. In this case, the location of the user 9 is determined to be "indoor". In a case where the obtained home ratio is 70% (the weighting 70) and "running" is specified in the stopping-movement specification (the weighting 10), the additional value of the weighting is 80. In this case, the location of the user 9 is determined to be "outdoor". In a case where the obtained home ratio is 80% (the weighting 80) and "stopping of the user 9" is specified in the stopping-movement specification (the weighting 90), the additional value of the weighting is 170. In this case, the location of the user 9 is determined to be "indoor".

The indoor determiner 440 may determine whether or not the user 9 is located indoors based on the result of the stopping-movement specification in the stopping-movement specifying unit 410, the connection condition, and the behavior pattern information 700. In this case, for example, the weighing is given to the type of the connection condition, the weighting is given to the value of the home ratio, and the weighting is given to the content specified in the stopping-movement specification, in the manner similar to the above description. The indoor determiner 440 obtains the home ratio corresponding to the current time and the current day from the behavior pattern information 700 in the indoor determination, confirms the result of the stopping-movement specification, and specifies the connection condition. Then, the indoor determiner 440 obtains an additional value of adding the weight corresponding to the obtained home ratio, the weight corresponding to the content specified in the stopping-movement specification, and the weight corresponding to the specified connection condition. The indoor determiner 440 determines that the location of the user 9 is "indoor" when the obtained additional value of the weights is equal to or larger than an eleventh threshold value, and determines that the location of the user 9 is "outdoor" when the additional value is smaller than the eleventh threshold value. The eleventh threshold value is set to 180, for example.

For example, in a case where the obtained home ratio is 40% (the weighting 40), "walking" is specified in the stopping-movement specification (the weighting 50), and it is specified that the home access point and the wireless communication unit 110 have the unstable communication connection (the weighting 50), the additional value of the weighting is 140. In this case, the location of the user 9 is determined to be "outdoor". For example, in a case where the obtained home ratio is 80% (the weighting 80), "stopping of the user 9" is specified in the stopping-movement specification (the weighting 90), and it is specified that the home access point and the wireless communication unit 110 have the stable communication connection (the weighting 90), the additional value of the weighting is 260. In this case, the location of the user 9 is determined to be "indoor".

In this manner, the indoor determiner 440 determines whether or not the user 9 is located indoors based on the behavior pattern information 700 and at least one of the result of the stopping-movement specification and the connection condition, thus the electronic apparatus 10 can determine whether or not the user 9 is located indoors more correctly.

As described above, the four types of indoor determinations according to the first to fourth examples are described. It is also applicable that the indoor determiner 440 performs the two types or more of the indoor determinations among the four types of the indoor determinations as the tentative indoor determinations in Step s3 described above, and finally determines whether or not the user 9 is located indoors based on the result of the tentative indoor determinations. For example, the indoor determiner 440 finally determines that the user 9 is located indoors when determining that the location of the user 9 is "indoor" in at least one type of the tentative indoor determination among the two or more types of the tentative indoor determinations which have been executed. Then, the indoor determiner 440 finally determines that the user 9 is not located indoors when determining that the location of the user 9 is "outdoor" in each of the two or more types of the tentative indoor determinations which have been executed.

Although the electronic apparatus 10 is a mobile phone, such as a smartphone, in the above-mentioned examples, the electronic apparatus 10 may be the other types of electronic apparatuses. The electronic apparatus 10 may be a tablet terminal, a personal computer, and a wearable apparatus, for example. The wearable apparatus used as the electronic apparatus 10 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus.

While the electronic apparatus 10 has been described above in detail, the above description is in all aspects illustrative and not restrictive. The various examples described above can be implemented in combination as long as they are not mutually inconsistent. It is understood that numerous examples which have not been exemplified can be devised without departing from the scope of the present disclosure.

The invention claimed is:

1. An electronic apparatus, comprising:
   a satellite signal receiver configured to receive a satellite signal from a positioning satellite;
   a wireless communicator; and
   at least one processor configured to
      perform an indoor determination that includes determining whether or not a user of the electronic apparatus is located in an indoor area based on at least one of a first determination based on a map and the satellite signal and a second determination based on a reception condition of the satellite signal receiver; and
      perform a determination processing that includes determining whether or not the wireless communicator transmits a notification to at least one of one or more roadside units and one or more vehicles based on a result of the indoor determination, wherein
   the at least one processor
      specifies a travel means of the user; and
      performs the indoor determination in accordance with a type of the travel means that is specified.

2. The electronic apparatus according to claim 1, wherein the at least one processor determines whether or not the user is located in the indoor area based on a change in a reception condition of the satellite signal receiver, which obtains positional information of the electronic apparatus based on the satellite signal received from the positioning satellite, and movement information indicating a movement of the user.

3. The electronic apparatus according to claim 2, wherein the movement information includes at least one of a continuous stopping time of the user, a continuous walking time of the user, a continuous walking step number of the user, and a traveling direction of the user.

4. The electronic apparatus according to claim 1, wherein the at least one processor determines whether or not the user is located in the indoor area based on a change in a reception condition of the satellite signal receiver, which obtains positional information of the electronic apparatus based on the satellite signal received from the positioning satellite, and a change in a height of a position of the electronic apparatus.

5. The electronic apparatus according to claim 1, wherein the at least one processor determines whether or not the user is located in the indoor area based on a change in a reception condition of the satellite signal receiver, which obtains positional information of the electronic apparatus based on the satellite signal received from the positioning satellite, and a change in a condition around the electronic apparatus.

6. The electronic apparatus according to claim 5, wherein the at least one processor determines whether or not the user is located in the indoor area based on at least one of changes in a temperature, a magnetic field, and a condition of air around the electronic apparatus and the change in the reception condition.

7. The electronic apparatus according to claim 2, wherein the at least one processor determines that the user is located in the indoor area, and subsequently specifies that the user gets outside based on the change in the reception condition and the movement information.

8. The electronic apparatus according to claim 4, wherein the at least one processor determines that the user is located in the indoor area, and subsequently specifies that the user gets outside based on the change in the reception condition and the change in the height.

9. An electronic apparatus, comprising:
   a satellite signal receiver configured to receive a satellite signal from a positioning satellite;
   a wireless communicator; and
   at least one processor configured to
      perform an indoor determination that includes determining whether or not a user of the electronic apparatus is located in an indoor area; and
      perform a determination processing that includes determining whether or not the wireless communicator transmits a notification to at least one of one or more roadside units and one or more vehicles based on a result of the indoor determination, wherein
   the at least one processor determines whether or not the user is located in the indoor area based on a change in a reception condition of the satellite signal receiver, which obtains positional information of the electronic apparatus based on the satellite signal received from the positioning satellite, and a change in a condition around the electronic apparatus, and
   the at least one processor determines that the user is located in the indoor area and subsequently specifies that the user gets outside, based on the change in the reception condition of the satellite signal receiver and the change in the condition around the electronic apparatus.

10. The electronic apparatus according to claim 1, wherein
the at least one processor further determines whether or not the user is located in the indoor area based on behavior pattern information indicating a behavior pattern of the user.

11. The electronic apparatus according to claim 1, wherein
the at least one processor
determines whether or not the electronic apparatus is located in a predetermined region,
performs the determination processing when the electronic apparatus is determined to be located in the predetermined region, and
does not perform the determination processing when the electronic apparatus is not determined to be located in the predetermined region.

12. An electronic apparatus, comprising:
a satellite signal receiver configured to receive a satellite signal;
a wireless communicator; and
at least one processor configured to
determine whether or not the electronic apparatus is located in a predetermined region,
perform an indoor determination that includes determining whether or not a user of the electronic apparatus is located in an indoor area based on at least one of a first determination based on a map and the satellite signal and a second determination based on a reception condition of the satellite signal receiver; and
perform a determination processing that includes determining whether or not the wireless communicator transmits a notification to at least one of one or more roadside units and one or more vehicles based on a result of the indoor determination, wherein
the at least one processor performs the indoor determination and the determination processing when the electronic apparatus is determined to be located in the predetermined region and does not perform the indoor determination and the determination processing when the electronic apparatus is not determined to be located in the predetermined region.

13. The electronic apparatus according to claim 1, wherein
the at least one processor is configured to cause the wireless communicator to transmit the notification in a broadcast form.

14. The electronic apparatus according to claim 13, wherein
the at least one processor is configured to:
cause the wireless communicator not to transmit the notification when the electronic apparatus determines that the user is located in the indoor area, and
cause the wireless communicator to transmit the notification when the electronic apparatus determines that the user is not located in the indoor area.

* * * * *